(12) United States Patent
Schmitt et al.

(10) Patent No.: US 8,970,614 B2
(45) Date of Patent: Mar. 3, 2015

(54) APPARATUS AND A METHOD FOR OBTAINING A BLUR IMAGE

(75) Inventors: Benjamin Schmitt, Musashino (JP); Olney Steven, Musashino (JP)

(73) Assignee: Digital Media Professionals Inc., Tokyo (JP)

( * ) Notice: Subject to any disclaimer, the term of this patent is extended or adjusted under 35 U.S.C. 154(b) by 259 days.

(21) Appl. No.: 13/637,020

(22) PCT Filed: Mar. 25, 2011

(86) PCT No.: PCT/JP2011/001755
§ 371 (c)(1),
(2), (4) Date: Sep. 24, 2012

(87) PCT Pub. No.: WO2011/118224
PCT Pub. Date: Sep. 29, 2011

(65) Prior Publication Data
US 2013/0042069 A1 Feb. 14, 2013

(30) Foreign Application Priority Data
Mar. 26, 2010 (JP) ................................. 2010-071461

(51) Int. Cl.
G09G 5/36 (2006.01)
G06T 1/60 (2006.01)

(52) U.S. Cl.
CPC ....................................... *G06T 1/60* (2013.01)
USPC ........................................................ 345/557

(58) Field of Classification Search
USPC ........................................................ 345/557
See application file for complete search history.

(56) References Cited

U.S. PATENT DOCUMENTS 6,864,994 B1 * 3/2005 Harrington .................... 358/1.9

FOREIGN PATENT DOCUMENTS

| JP | 2004-185611 A | 7/2004 |
| JP | 2005-293061 A | 10/2005 |
| JP | 2006-72829 A | 3/2006 |
| JP | 2007-028348 A | 2/2007 |
| JP | 2010-009599 A | 1/2010 |

OTHER PUBLICATIONS

International Search Report for PCT/JP2011/001755 from the Japanese Patent Office completed on Jun. 14, 2011 and mailed Jun. 21, 2011 (4 pages).

* cited by examiner

*Primary Examiner* — Maurice L McDowell, Jr.
*Assistant Examiner* — Kyle Zhai
(74) *Attorney, Agent, or Firm* — Pyprus Pte Ltd

(57) ABSTRACT

[Problem] The present invention provides an apparatus and a method, which can reduce required memory, for obtaining blur image in computer graphics.
[Method of solution] The present invention performs processing leaving only the calculation results of the necessary column to obtain blur image without full memory of the SAT table. As a result, the present invention provides an apparatus and a method, which can reduce required memory, for obtaining blur image in computer graphics.

9 Claims, 14 Drawing Sheets

(a)

(b)

(c)

APPARATUS AND A METHOD FOR OBTAINING A BLUR IMAGE

TECHNICAL FIELD

The present invention relates to an apparatus and a method for obtaining a blur image in computer graphics.

BACKGROUND ART

Japanese patent publication No. 2006-72829A discloses a system obtaining a blur image by using SAT (Summed-area tables).

SAT was calculated from input image data to obtain blur images. A SAT data of a pixel at (x, y) coordinates are denoted by sat(x, y). A pixel data of an input pixel is denoted by i(x, y). Then sat(x, y) is obtained as follows.

$$sat(x, y) = \sum_{x' \leq x, y' \leq y} i(x', y') \quad [\text{Equation 1}]$$

Equation 1 can be also expressed as follows:

$$sat(x,y)=i(x,y)+sat(x-1,y)+sat(x,y-1)-sat(x-1,y-1) \quad [\text{Equation 2}]$$

sat(−1, y), sat(x, −1) and sat(−1, −1) are equal to zero at any x or y.

Following Table 1 shows an example of original data and SAT (summed area table) of a virtual image comprising 4 by 4 pixels.

TABLE 1

| 2 | 3 | 2 | 1 | → SAT Calculation → | 2 | 5 | 7 | 8 |
|---|---|---|---|---|---|---|---|---|
| 3 | 0 | 1 | 2 | | 5 | 8 | 11 | 14 |
| 1 | 3 | 1 | 0 | | 6 | 12 | 16 | 19 |
| 1 | 4 | 2 | 2 | | 7 | 17 | 23 | 28 |

It is necessary that SAT which has the same size of original image is calculated and then the SAT is stored in a memory to obtain blur image by using SAT as mentioned above (paragraph [0022], Japanese patent publication No. 2006-72829A). Table 1 shows an example of virtual image comprises 4 by 4 pixels. In computer systems, pixels are represented as a set of bits, usually 32 bits if a pixel represents a color. By definition, when summing 32 bits pixel values, in order to represent the full range of the result, more than 32 bits per pixels are required. In a typical case, for an image of size W times H, the required number of bits per pixels for storing the sat summation is defined as 32 bits plus four times the logarithm of W and H. For instance, for a 1280×1024 images, not less than 128 bits are required. In that sense, memory storage requirement for storing the entire SAT table may be too prohibitive in a computer graphics system. In addition, due to the number of bits per sat pixel, memory accesses may be too slow due to limited memory bandwidth. Actual images have far more pixels than the example of Table 1. Thus much memory is required to store SAT, and it takes much time to read the data from the SAT.

FIG. 1 shows the concept of SAT. In this figure, a point means a pixel of coordinates (x, y). Sat(x, y) to calculate the blur image data of the point (x, y) represented as a closed circle, is expressed as following Equation 3.

$$sat(x, y) = \sum_{x' \leq x, y' \leq y} i(x', y') = \quad [\text{Equation 3}]$$

$$sat(X_r, Y_t) - sat(X_r, Y_b) - sat(X_l, Y_t) + sat(X_l, Y_b)$$

The blur image data of the point, which is located at the center of the coordinates $(X_r, Y_t)$, $(X_r, Y_b)$, $(X_l, Y_t)$ and $(X_l, Y_b)$ in FIG. 1, is expressed as following Equation 4. In Equation 4, $w=X_r-X_l$ and $h=Y_t-Y_b$.

$$average(x, y) = \frac{sat(x, y)}{w \times h} \quad [\text{Equation 4}]$$

By using SAT, it is possible to obtain any average image by adjusting w and h, which are represented as filter ratio W.

FIG. 2 shows an example of a blur image by using SAT. FIG. 2(a) shows an image when W=1 (the original image). FIG. 2(b) shows a blur image when W=5. FIG. 2(c) shows a blur image when W=15. FIG. 2(d) shows a blur image when W=30. As shown in FIG. 2, SAT enables to adjust the amount of blur effect.

PRIOR ART PUBLICATION

Patent Document

Patent document 1: Japanese patent publication No. 2006-72829A

SUMMARY OF INVENTION

Problems to be Solved by the Invention

As mentioned above, SAT which has the same size of original image is stored to obtain blur images by using SAT.

On the other hand, there is a need of real time blur effects for the entire or a part of the animation. The blur processing by using SAT mentioned above, requires continuous SAT calculation on the entire screen of the animation. Thus, the SAT calculation to obtain blur images in usual way usually requires a too large amount of memory.

The present invention provides an apparatus and a method, which can reduce required memory, for obtaining blur image in computer graphics.

Means for Solving the Problem

A first aspect of the present invention relates to a system for obtaining blur image for computer graphics.

An example of the present invention can be realized by the computer contains chips or software for image processing. This computer has hardware for image processing. A control part accepts processes from the main program which is stored in main memory. The control part reads data which is stored in the memory, and then it makes a calculation part by using the input data. The calculation in the calculation part also includes the following blur image calculation. The result of the calculation is stored in the memory as appropriate, and then output into an output device such as a monitor. The following each function and device may be implemented by hardware resources such as circuits, chips, and cores, or realized by cooperative work of calculating circuit etc. and software.

The coordinates to obtain blur image data are denoted by (x, y). The input image data on the coordinates (X, Y) is denoted by i(X,Y). The blur image data on the coordinates (x, y) is denoted by $I_{Blur}(x, y)$. Blur images are obtained from all the pixels on the screen stored in the image data. Blur image data is the blurred data which is necessary for computer graphics, such as Red(R) of RGB color value and transparency, as mentioned below. Points the x-coordinate of which differs by a predetermined value from the coordinates (x, y), and the y-coordinate of which differs by a predetermined value from the coordinates (x, y), are denoted by $(X_r, Y_t)$, $(X_r, Y_b)$, $(X_l, Y_t)$ and $(X_l, Y_b)$. L is set to larger than r and b is set to larger than t. A value which satisfies following Equation I is denoted by sat(X,Y) on a point (X,Y). A value which satisfies following Equation II is denoted by Sat(x, y). $X_l - X_r$, is denoted by w, and $Y_b - Y_t$ is denoted by h. $I_{Blur}(x, y)$ is set at a value denoted by following Equation III.

Equation III is as follows, $$I_{Blur}(x,y) = \text{Sat}(x,y)/w \times h \qquad \text{Equation III}$$

where, $$\text{Sat}(x,y) = \text{sat}(X_r, Y_t) - \text{sat}(X_r, Y_b) - \text{sat}(X_l, Y_t) + \text{sat}(X_l, Y_b) \qquad \text{Equation II}$$

t means top, and b means bottom at the y-coordinate.

This system may be implemented only by hardware. The system may be implemented by both hardware and software. When the system is implemented by both hardware and software, the system has an input/output part, a controller, a calculator, a memory. These modules are connected by, for example, busses, so as to transfer data. The memory stores a control program. When predetermined data are input to the input part, the controller reads the stored control program and necessary data from the memory as appropriate, and then performs a calculation in the calculator. The result of the calculation is stored in the memory. The result of the calculation is output from the input/output part.

This system has an input device for input image data to accept an input image data i(X, Y).

This system has a sat calculation device (21) to calculate sat data denoted by Equation I, using input image data i(X,Y) which is accepted by the input device. Specifically, the sat calculation device calculates from sat(X, 0) of sat(0,0) by using i(X, 0). In this calculation, this value can be obtained by reading sat(X−1, 0) and i(X, 0) and adding two values. After the first row, i(X, Y), sat(X−1, Y), sat(X−1, Y) and sat(X−1, Y−1) are read, and sat data are obtained by addition and sign conversion (converting plus to minus).

Equation I is as follows.

$$\text{sat}(X,Y) = i(X,Y) + \text{sat}(X-1,Y) + \text{sat}(X,Y-1) - \text{sat}(X-1,Y-1) \qquad (I)$$

However when X−1 is equal to −1, sat(X−1, Y) and sat(X−1, Y−1) are equal to 0. And when Y−1 is equal to −1, sat(X,Y−1) and sat(X−1,Y−1) are equal to 0.

This system has caches to store the results of sat calculation per row calculated by the sat calculation device. The caches are comprised of a first cache and a second cache. The first cache is comprised of a front cache 22a and a back cache 22b. The second cache is comprised of a front cache 23a and a back cache 23b. These caches are designated by, for example, a flag.

This system comprises a Sat calculation device (24) to read the values of sat$(X_r, Y_t)$, sat$(X_r, Y_b)$, sat$(X_l, Y_t)$ and sat$(X_l, Y_b)$ from the caches, and to calculate the Sat(X, Y) from the values. Sat(x, y) is denoted by the Equation II. Thus sat$(X_r, Y_t)$, sat$(X_r, Y_b)$, sat$(X_l, Y_t)$ and sat$(X_l, Y_b)$ are read, and Sat values are obtained by addition and sign conversion processing (converting plus to minus).

This system has a device for obtaining blur image data (25) calculating $I_{Blur}(x, y)$, the Sat(x, y) value calculated by the Sat calculation device, w and h. $I_{Blur}(x, y)$ is calculated in Equation III. Thus $I_{Blur}(x, y)$ can be calculated from Sat(x, y), w and h, by using a multiplier and a 1/x circuit.

This system can obtain $I_{Blur}(x, y)$ as follows.

At first, the sat calculation device calculates sat(X, 0) which is the sat data of the first row by using input image data i(X, 0) of the first row. Then the front cache of the first cache stores sat(X, 0) which is the result of the sat calculation of the first row.

Next, the sat calculation device calculates sat(X, 1) which is the sat data of the second row by using input image data i(X, 1) of the second row, and sat(X, 0) which is the result of the sat calculation of the first row and stored in the front cache of the first cache. Then the back cache of the first cache stores sat(X, 1) which is the result of the sat calculation of the second row, The sat calculation device calculates sat(X, 3) which is the sat data of the third row by using input image data i(X, 2) of the third row, and sat(X, 1) which is the result of the sat calculation of the second row and stored in the back cache of the first cache. The front cache of the first cache updates memory by using sat(X, 2) which is the result of the sat calculation of the third row.

In this way sat data that is not used in Sat calculation is erased alternately. Further, updating the front cache and second cache alternately realizes effective renewal of required data with lesser memory capacity.

sat(X, $Y_t$−1) which is result of the sat calculation of the ($Y_t$−2)th row is stored by either the front cache of the first cache or the back cache of the first cache.

The same calculation mentioned above is that the sat calculation device calculates sat(X, m−1) which is the sat data of the (m)th row by using the input image data i(X, m−1) of the (m)th row, and sat(X, m−2) which is the result of the sat calculation of the (m−1)th row and stored in either the front cache of the first cache or the back cache of the first cache. Then either cache updates memory by sat(X, m−1) which is the result of the sat calculation of the (m)th row. This calculation continues until m=$Y_t$−2.

Then sat(X, $Y_t$) which is result of the sat calculation of the ($Y_t$−1)th row is stored by the one of the front cache of the first cache and the back cache of the first cache which does not store sat(X, $Y_t$−1).

The sat calculation device calculates sat(X, $Y_t$+1) which is the sat data of the (Y)th row by using input image data i(X, $Y_t$+1) of the ($Y_t$)th row and sat(X, $Y_t$) read from the cache. The front cache of the second cache stores sat(X, $Y_t$+1) which is the result of the sat calculation of the ($Y_t$)th row.

The sat calculation device calculates sat(X, $Y_t$+2) which is the result of sat calculation of the ($Y_t$−1)th row by using input image data i(X, $Y_t$+2) of the ($Y_t$−1)th row and sat(X, $Y_t$+1) read from the front cache of the second cache. The hack cache of the second cache stores sat(X, $Y_t$+2) which is the result of the sat calculation of the ($Y_t$−1)th row.

The sat calculation device calculates sat(X, $Y_t$+3) which is the result of sat calculation of the ($Y_t$+2)th row by using input image data i(X, $Y_t$+3) of the ($Y_t$+2)th row and sat(X, $Y_t$+2) read from the back cache of the second cache. The front cache of the second cache updates memory by using sat(X, $Y_t$+3) which is the result of the sat calculation of the ($Y_t$+2)th row.

This system continues the calculation in the same way. Then sat(X, $Y_b$−1) which is the result of the sat calculation of the ($Y_{b-2}$)th row is stored by either the front cache of the second cache or the back cache of the second cache.

sat(X, $Y_b$), which is result of the sat calculation of the ($Y_b$−1)th row, of at least from X=0 to X=$X_t$ is stored by the one of the front cache of the second cache and the back cache of the second cache which does not store sat(X, $Y_b$−1).

Equation I is as below.

$$\text{sat}(X,Y)=i(X,Y)+\text{sat}(X-1,Y)+\text{sat}(X,Y-1)-\text{sat}(X-1,Y-1) \quad \text{Equation I}$$

In Equation I, when X−1 is equal to −1, sat(X−1, Y) and sat(X−1, Y−1) are equal to 0. And when Y−1 is equal to −1, sat(X, Y−1) and sat(X−1, Y−1) are equal to 0.

Equation II is as below.

$$\text{Sat}(x,y)=\text{sat}(X_r,Y_t)-\text{sat}(X_r,Y_b)-\text{sat}(X_l,Y_t)+\text{sat}(X_l,Y_b) \quad \text{Equation II}$$

Equation III is as below.

$$I_{Blur}(x,y)=\text{Sat}(x,y)/w\times h \quad \text{Equation III}$$

A preferred embodiment of the present invention is a system mentioned above, wherein i(x, y) is a value of either R, G or B which indicates a color.

A preferred embodiment of the present invention is a system mentioned above, wherein the i(x, y) is a value of either R, G or B which indicates a color, or an α value which indicates a transparency.

A preferred embodiment of the present invention is a system mentioned above, wherein the one of the front cache of the first cache and the back cache of the first cache which stores the sat(X, $Y_t$−1) is used as a cache for a process except obtaining blur image data during the calculation of the $I_{Blur}$(x, y) from the result of the sat calculation of the ($Y_t$)th row.

A second aspect of the present invention relates to a system for obtaining blur image data for computer graphics comprises a device for determination of coefficient (11) and a blur image obtaining part (12). The blur image obtaining part (12) operates in the same way as the system mentioned above.

Coordinates to obtain blur image data are denoted by (x, y), an input image data on the coordinates (x, y) is denoted by i(x, y), an blur image data on the coordinates (x, y) is denoted by $I_{Blur}$(x, y), points the x-coordinate of which differs by a predetermined value from the coordinates (x, y), and the y-coordinate of which differs by a predetermined value from the coordinates (x, y), are denoted by ($X_r$, $Y_t$), ($X_r$, $Y_b$), ($X_l$, $Y_t$) and ($X_l$, $Y_b$), l>r and b>t, a value which satisfies following Equation Ia is denoted by sat(X, Y) on a point (X, Y), a value which satisfies following Equation II is denoted by Sat(x, y), $X_l$−$X_r$, is denoted by w, and $Y_b$−$Y_t$ is denoted by h.

The $I_{Blur}$(x, y) is set at a value denoted by following Equation III or IIIa, The blur image obtaining part (12) comprising:

an input device for input image data (20) to accept an input image data i(X, Y) on coordinates (X, Y), and a blur coefficient w(X, Y) from the device for determination of coefficient (11), a sat calculation device (21) to calculate sat data denoted by Equation Ia, using input image data i(X, Y) which is accepted by the input device, caches (22, 23) to store results of the sat calculation per row calculated by the sat calculation device, a Sat calculation device (24) to read the values of sat(Xr, Yt), sat(Xr, Yb), sat(Xl, Yt) and sat(Xl, Yb) from the caches, and to calculate the Sat(X, Y) from the values a device for obtaining blur image data (25) using $I_{Blur}$(x, y), the Sat(x, y) value calculated by the Sat calculation device.

The caches are comprised of a first cache (22) and a second cache (23), the first cache are comprised of a front cache (22a) and a back cache (22b), the second cache are comprised of a front cache (23a) and a back cache (23b).

The sat calculation device calculates sat(X, 0) which is the sat data of the first row by using input image data i(X, 0) of the first row, the front cache of the first cache stores sat(X, 0) which is the result of the sat calculation of the first row.

The sat calculation device calculates sat(X, 1) which is the sat data of the second row by using input image data i(X, 1) of the second row, and sat(X, 0) which is the result of the sat calculation of the first row and stored in the front cache of the first cache. The back cache of the first cache stores sat(X, 1) which is the result of the sat calculation of the second row.

The sat calculation device calculates sat(X, 3) which is the sat data of the third row by using input image data i(X, 2) of the third row, and sat(X, 1) which is the result of the sat calculation of the second row and stored in the back cache of the first cache, the front cache of the first cache updates memory by using sat(X, 2) which is the result of the sat calculation of the third row.

The calculation is continuing in the same way. Then sat(X, $Y_t$−1) which is result of the sat calculation of the ($Y_t$−2)th row is stored by either the front cache of the first cache or the back cache of the first cache.

sat(X, $Y_t$) which is result of the sat calculation of the ($Y_t$−1)th row is stored by the one of the front cache of the first cache and the back cache of the first cache which does not store the sat(X, $Y_t$−1).

The sat calculation device calculates sat(X, $Y_t$+1) which is the sat data of the ($Y_t$)th row by using input image data i(X, $Y_t$+1) of the ($Y_t$)th row and the sat(X, $Y_t$) read from the cache, the front cache of the second cache stores sat(X, $Y_t$+1) which is the result of the sat calculation of the ($Y_t$)th row.

The sat calculation device calculates sat(X, $Y_t$+2) which is the result of sat calculation of the ($Y_t$+1)th row by using input image data i(X, $Y_t$+2) of the ($Y_t$+1)th row and the sat(X, $Y_t$+1) read from the front cache of the second cache, the back cache of the second cache stores sat(X, $Y_t$+2) which is the result of the sat calculation of the ($Y_t$+1)th row.

The sat calculation device calculates sat(X, $Y_t$+3) which is the result of sat calculation of the ($Y_t$+2)th row by using input image data i(X, $Y_t$+3) of the ($Y_t$+2)th row and the sat(X, $Y_t$+2) read from the back cache of the second cache, the front cache of the second cache updates memory by using sat(X, $Y_t$+3) which is the result of the sat calculation of the ($Y_t$+2)th row.

The calculation is continuing in the same way. Then sat(X, $Y_b$−1) which is the result of the sat calculation of the ($Y_b$−2)th row is stored by either the front cache of the second cache or the back cache of the second cache.

sat(X, $Y_b$), which is result of the sat calculation of the ($Y_b$−1)th row, of at least from X=0 to X=$X_l$ is stored by the one of the front cache of the second cache and the back cache of the second cache which does not store the sat(X, $Y_b$−1).

$$\text{sat}(X,Y)=w(X,Y)\times i(X,Y)+\text{sat}(X-1,Y)+\text{sat}(X,Y-1)-\text{sat}(X-1,Y-1) \quad \text{Equation Ia}$$

In Equation Ia, when X−1 is equal to −1, sat(X−1, Y) and sat(X−1, Y−1) are equal to 0. And when Y−1 is equal to −1, sat(X, Y−1) and sat(X−1, Y−1) are equal to 0.

$$\text{Sat}(x,y)=\text{sat}(Xr,Yt)-\text{sat}(Xt,Yb)-\text{sat}(Xl,Yt)+\text{sat}(Xl,Y_b) \quad \text{Equation II}$$

$$I_{Blur}(x,y)=\text{Sat}(x,y)/w\times h \quad \text{Equation III}$$

$$I_{Blur}(x,y)=\text{Sat}(x,y)/W \quad \text{Equation IIIa}$$

$$W = \sum_{i=-\frac{w}{2}}^{i=\frac{w}{2}} \sum_{j=-\frac{h}{2}}^{j=\frac{h}{2}} w(i, j)$$ [Equation 5]

A preferred embodiment of the present invention is a system mentioned above, wherein the device for determination of coefficient (11) comprises,
an input device to input information of depth z(X, Y) or distance d(X, Y) of input image data i(X, Y),
an threshold input device to input a first threshold A and a second threshold B,
a comparison calculation device to compare depth z(X, Y) or distance d(X, Y) with the first threshold A and the second threshold B,
and a device for determination of coefficient to determine w(X, Y) corresponding to the result of the comparison calculation device. The device for determination of coefficient sets w(X, Y) at 0 when the depth z(X, Y) or distance d(X, Y) is larger than or equal to the first threshold A, set w(X, Y) at 1 when the depth z(X, Y) or distance d(X, Y) is smaller than or equal to the second threshold B, and set w(X, Y) at a value between 0 and 1 when the depth z(X, Y) or distance d(X, Y) is larger than the second threshold B and smaller than the first threshold A.

Information of depth z(X, Y) or distance d(X, Y) of input image data i(X, Y) is input to the input device. On the other hand a first threshold A and a second threshold B are input to the threshold input device. A comparison calculation device compares depth z(X, Y) or distance d(X, Y) with the first threshold A and the second threshold B. A device for determination of coefficient determines w(X, Y) corresponding to the result of the comparison calculation device. The device for determination of coefficient sets w(X, Y) at 0 when the depth z(X, Y) or distance d(X, Y) is larger than or equal to the first threshold A. The device for determination of coefficient sets w(X, Y) at 1 when the depth z(X, Y) or distance d(X, Y) is smaller than or equal to the second threshold B. The device for determination of coefficient sets w(X, Y) at a value between 0 and 1 when the depth z(X, Y) or distance d(X, Y) is larger than the second threshold B and smaller than the first threshold A. For example, w(X, Y) may be a value such as A−z/A−B and A−d/A−B, or read from a lookup table.

A preferred embodiment of the present invention is a system mentioned above, wherein the device for determination of coefficient (11) comprises,
an object input device to input information of a target object for blur effect, the input image data i(X, Y) and an object identification number in a computer graphics system, and a means for determining coefficient which is configured to recognize the target object to be blurred by means of the information of the target object to be blurred, an identification number of the object and the input image data I (X,Y), thereby the means sets the blur coefficient of the object w(X,Y) to be 1

Information of an target object for blur effect and the input image data i(X, Y) and an object identification number in a computer graphics are input to the object input device. The device for determination of coefficient sets the blur coefficient w(X,Y), which relates to the target object for blur effect, at 1 by grasping the target object for blur effect by using the information of the target object for blur effect, the object identification number and input image data i(X, Y).

A preferred embodiment of the present invention is a system mentioned above, wherein the device for determination of coefficient (11) comprises, an object input device to input information of an target object for blur effect, the input image data i(X,Y) and an object identification number in a computer graphics system,
a mask area obtaining device for obtaining a mask area of pixel data of the object identified by the object input device,
an image data obtaining device of a mask area for obtaining new image data of the mask area obtained by the mask area obtaining device, and,
a device for determination of coefficient to set the coefficient w(x, y) of the mask area at 1. The blur image obtaining part (12) accepts the coefficient w(x, y)=1 and the new image data as input image data, concerning the mask area determined by the device for determination of coefficient (11), and then obtains the blur image of the mask of the object.

Information of a target object for blur effect, the input image data i(X, Y) and an object identification number in a computer graphic are input to the object input device. The mask area obtaining device obtains a mask area of pixel data of the object identified by the object input device. The mask area is the area indicates the location of the object in the computer graphic. The image obtaining device obtains new image data of the mask area obtained by mask area obtaining device. For example, light information may be read from such as a database as color information of the mask to obtain a dimly glowing object. The device for determination of coefficient sets the coefficient w(x, y) of the mask area at 1. The blur image obtaining part (12) accepts the coefficient w(x, y)=1 and the new image data as input image data, concerning the mask area determined by the device for determination of coefficient (11), and then obtains the blur image of the mask of the object. A blurred image including the surrounding of the object can be obtained as a result. For example, if a dimly glowing object is needed, a mask for glowing for an object and its surrounding can be obtained in this way. Then the image of the dimly glowing object can be obtained by synthesis of the mask and the original image.

The present invention provides a program for a computer which functions as the system mentioned above. Further, the present invention also provides a computer readable medium which is stored the program.

Advantageous Effects of the Invention

The present invention provides an apparatus and a method, which can reduce required memory, for obtaining blur image in computer graphics.

BRIEF DESCRIPTION OF DRAWINGS

FIG. 2(a) shows an image when W=1 (the original image).
FIG. 2(b) shows a blur image when W=5.
FIG. 2(c) shows a blur image when W=15.
FIG. 2(d) shows a blur image when W=30.

FIG. 11(*b*) shows a blur image using the mask of FIG. 11(*a*). FIG. 11(*c*) shows a smooth mask using the threshold A and B.

DESCRIPTION OF EMBODIMENTS FOR CARRYING OUT THE INVENTION

First Embodiment

The first embodiment of the present invention is explained below.

Figure 1:
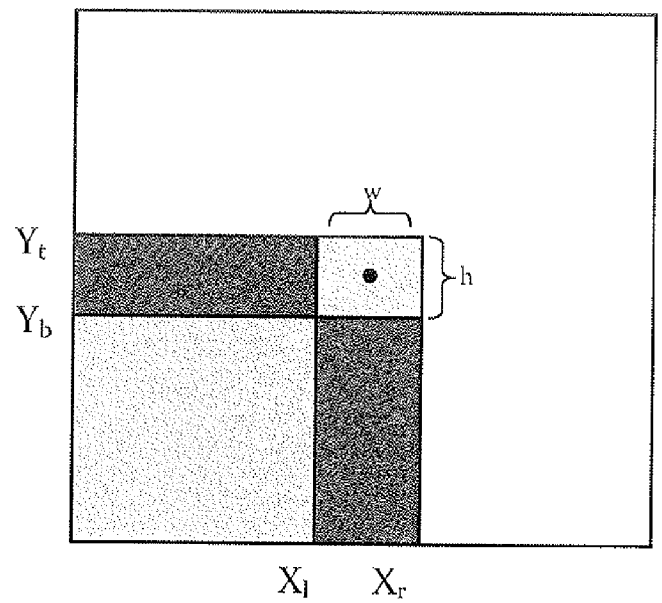
FIG. 1 shows 4 points to calculate Sat(x, y)
Figure 2:
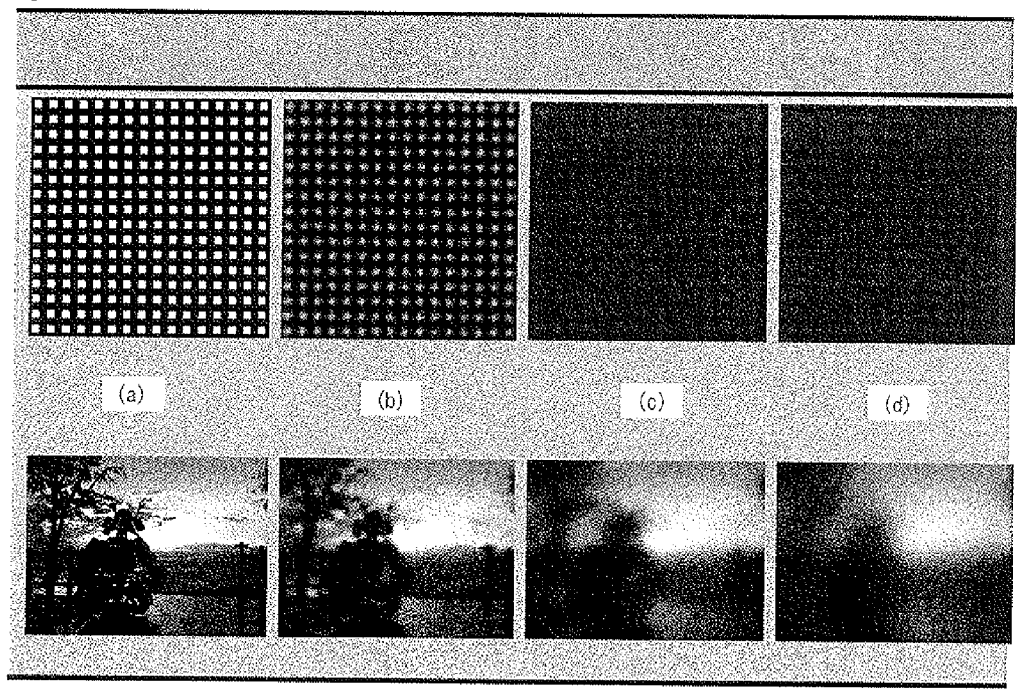
FIG. 2 shows an example of a blur image by using SAT.
Figure 3:
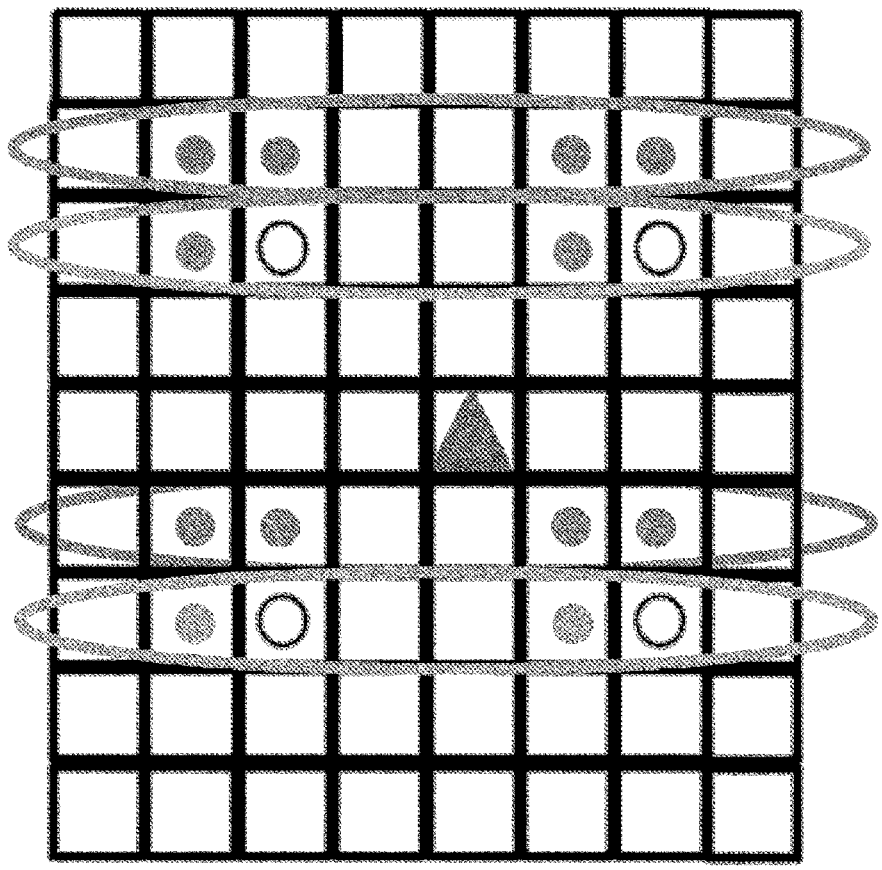
FIG. 3 shows a conceptual diagram to explain blur image data.

FIG. 3 shows a conceptual diagram to explain blur image data. Each square represents a pixel. The triangle in FIG. 3 represents the pixel to obtain blur image data. The triangle corresponds to the coordinates (x, y) in FIG. 1. The open circles in the FIG. 3 correspond to the coordinates $(X_r, Y_t)$, $(X_r, Y_b)$, $(X_l, Y_t)$ and $(X_l, Y_b)$ in FIG. 1. Then Sat(x, y) are calculated from Equation III.

$$I_{Blur}(x,y) = Sat(x,y)/w \times h \qquad \text{Equation III}$$

$$Sat(x,y) = sat(X_r, Y_t) - sat(X_r, Y_b) - sat(X_l, Y_t) + sat(X_l, Y_b) \qquad \text{Equation II}$$

On the other hand, the coordinates $(X_r, Y_t)$, $(X_r, Y_b)$, $(X_l, Y_t)$ and $(X_l, Y_b)$ are calculated from Equation I. Equation I indicates that a sat of an image(x, y) can be obtained from input data i(x, y) of the image(x, y), sat data(sat(x−1, y)) which has x coordinate less than that of the pixel by 1, sat data(sat(x, y−1)) which has y coordinate less than that of the pixel by 1, sat data(sat(x−1, y−1)) which has x coordinate and y coordinate less than that of the pixel by 1.

$$sat(X,Y) = i(X,Y) + sat(X-1,Y) + sat(X,Y-1) - sat(X-1,Y-1) \qquad \text{Equation I}$$

In Equation I, when X−1 is equal to −1, sat(X−1, Y) and sat(X−1, Y−1) are equal to 0. And when Y−1 is equal to −1, sat(X, Y−1) and sat(X−1, Y−1) are equal to 0.

Namely, the sat(X, Y) of the coordinates $(X_r, Y_t)$, $(X_r, Y_b)$, $(X_l, Y_t)$ and $(X_l, Y_b)$ in FIG. 3 can be calculated from the input data of each coordinates, the sat of the left coordinates, the sat of the upper coordinates and the sat of the upper left coordinates. The left coordinates, the upper coordinates and the upper left coordinates of each open circle are represented by closed circles in FIG. 3.

Therefore if the data of only 4 rows including the open circles and the closed circles exist (sat data and input data), Sat(x, y) can be obtained to obtain blur image data.

If an image(x, y) is on the left side of the image, there is a case that $(X_r, Y_t)$ and $(X_r, Y_b)$ do not exist. In this case, sat$(X_r, Y_t)$ and sat$(X_r, Y_b)$ may be set at 0. Of course if an image(x, y) is on the upper left side of the image, there is a case that $(X_l, Y_t)$ do not exist. In this case, sat$(X_l, Y_t)$ may be also set at 0.

Namely, when X−1 is equal to −1, sat(X−1, Y) and sat(X−1, Y−1) are equal to 0. And when Y−1 is equal to −1, sat(X, Y−1) and sat(X−1, Y−1) are equal to 0 in Equation I. x=0 and y=0 are the coordinates of the upper left point in Equation I. Thus if the coordinates of the upper left point are x=1 and Y=1, sat of x=0 and y=0 may be set at 0.

Further, for example, when value W which represents blur rate is input to a computer, the values of w and h may be obtained by using the blur rate. Namely the larger W is, the wider area may be blurred. The correspondences of W to w and h may be stored, for example, in a 1D lookup table, and then w and h may be obtained by using input W. Further, the value of w×h which is necessary in the calculation may be also stored in the lookup table, and then the multiplication value may be read from the look up table not to multiply w by h in the calculation.

Next, steps for obtaining blur image data of the triangle in the FIG. 3 are explained below.

This triangle has values such as color values (R, G, B) and transparency (a), so blurred values of these values are obtained. Further, blur image can be obtained by obtaining blur image data from whole or at least a certain area of the screen.

At first, the sat calculation device calculates sat(x, y) of the first row by using input data i(x, y) (y=0). At this point y=0. x is the x coordinates of the pixels of 0 to the right end. The front cache of the first cache stores sat(x, 0) which is the result of the sat calculation of the first row.

For example, i(x, y) may be the value of red $R_i(x, y)$, the value of green $G_i(x, y)$, the value of blue $B_i(x, y)$ or the value of transparency $\alpha_i(x, y)$.

sat(x, 1) of the second row is calculated by using input data i(x, 1) and sat(x, 0) of the first row. Then the back cache of the first cache stores sat(X, 1) which is the result of the sat calculation of the second row.

For example, when a computer calculates sat(1, 1), this action stores the input i(1, 1) in memory. Then i(1, 1), sat(0, 1), sat(1, 0) and sat(0, 0) are read from the memory. Further, sat(1, 1)=i(1, 1) sat(0, 1)+sat(1, 0)−sat(0, 0) is calculated by addition and subtraction processing (addition and sign conversion processing), and then the result is stored in memory. sat(1, 1) can be calculated in this way. Other values of sat(x, 1) are calculated in the same way.

For example, when a computer calculates sat(0, 1), this action stores the input i(0, 1) in memory. Then i(0, 1), sat(−1, 1), sat(0, 0) and sat(−1, 0) are read from the memory. Because sat(−1, 1) and sat(−1, 0) are equal to 0, these values may be stored, and then addition and subtraction of i(0, 1), sat(−1, 1), sat(0, 0) and sat(−1, 0) may be performed to calculate sat(0, 1).

Next, sat(x, 2) is calculated by using input data i(x, 2) and sat(x, 1) of the second row. Then calculated sat(x, 2) of the third row is stored in the front cache of the first cache. In this step, sat(x, 0) of the first row is overwritten by sat(x, 2) of the third row, so the data about sat(x, 0) of the first row is erased from the front cache of the first cache.

In the example of FIG. 3, there are sat$(X_r, Y_t)$ and sat$(X_l, Y_t)$ in sat(x, 2) of the third row. Namely the values of sat$(X_r, Y_t)$ and sat$(X_l, Y_t)$ can be read from the front cache of the first cache.

Next, sat(x, 3) of the forth row is calculated by using input data i(x, 3) and sat(x, 2) of the third row. The front cache of the second cache stores the calculated sat(x, 3). In this example, sat(x, 1) will not be used hereafter. The back cache of the first cache may be deleted and used as memory space for other process during the calculation of blur images of the next row.

Assuming the sat calculation is continuing in the same way, until the row whose y coordinate is equal to $(Y_b-1)$. Further assuming the value of the sat$(x, Y_b-1)$ is stored in the front cache of the second cache. In another case, the value of the sat$(x, Y_b-1)$ is stored in the back cache of the second cache. In following explanation, assuming the value of the sat$(x, Y_b-1)$ is stored in the front cache of the second cache.

The same calculation mentioned above is that the sat calculation device calculates sat$(X, m-1)$ which is the sat data of the (m)th row by using the input image data i$(X, m-1)$ of the (m)th row, and sat$(X, m-2)$ which is the result of the sat calculation of the (m-1)th row and stored in the back cache of the first cache. Then either cache updates memory by sat$(X, m-1)$ which is the result of the sat calculation of the (m)th row. This calculation continues until m=$Y_r-2$.

Next, sat$(x, Y_b)$ of the row including $(X_r, Y_b)$ and $(X_l, Y_b)$ is calculated by using input data i$(x,Y_b)$ and sat$(x,Y_b-1)$ until sat$(x,Y_b-1)$. There is no need to calculate sat$(x,Y_b)$ after $(x, Y_b+1)$ in order to calculate Sat$(x, y)$. However sat$(x,Y_b)$ after $(x, Y_b+1)$ may be calculated so as to use in later calculation. Then sat$(x, Y_b)$ is stored in the back cache of the second cache. In this step, sat$(x, Y_b)$ is overwritten, so the data about sat$(x, Y_b-2)$ of the first row is erased from the hack cache of the second cache.

As mentioned above, the values of the sat$(X_r, Y_t)$ and sat$(X_l, Y_t)$ can be read from the front cache of the first cache. The values of the sat$(X_r, Y_b)$ and sat$(X_l, Y_b)$ can be read from the back cache of the second cache.

Then the system for obtaining blur image of the present invention reads sat$(X_r, Y_t)$, sat$(X_l, Y_t)$, sat$(X_r, Y_b)$ and sat$(X_l, Y_b)$ from these caches. It calculates Sat$(x, y)$ according to Equation II by, for example, a sign converter and an adder. The controller ordered from a control program may read sat$(X_r, Y_t)$, sat$(X_l, Y_t)$, sat$(X_r, Y_b)$ and sat$(X_l, Y_b)$ from the caches, and then may make the calculator calculate sat$(X_r, Y_t)$−sat$(X_r, Y_b)$−sat$(X_l, Y_t)$+sat$(X_l, Y_b)$ so as to perform this calculation. The calculation is continuing in the same way.

Further blur image data on coordinates (x, y) can be obtained according to Equation III because the value of w and h are stored in the memory.

For example, blur image data is either R, G or B that indicates color, or α that indicates transparency.

Next, assuming to calculate blur image data on the point (x, y+1) next to the point (x, y) represented by the triangle in FIG. 3.

In this case the blur data on the point (x, y+1) can be obtained from sat$(X_r+1, Y_1)$, sat$(X_l+1, Y_t)$, sat$(X_r+1, Y_b)$ and sat$(X_l+1, Y_b)$, w and h. sat$(X_r+1, Y_t)$, sat$(X_l+1, Y_t)$ and sat $(X_l+1, Y_b)$ are read from the caches because they have been already calculated. If sat$(X_l+1, Y_b)$ have been already calculated and stored in the caches, sat$(X_l+1, Y_b)$ may be read. On the other hand if sat$(X_l+1, Y_b)$ have not been calculated, sat$(X_l+1, Y_b)$ is calculated from i$(X_l+1, Y_b)$, sat$(X_l, Y_b)$, sat$(X_l+1,Y_b-1)$ and sat$(X_l,Y_b-1)$, and then calculated sat$(X_1+1, Y_b)$ is stored in the back cache of the second cache.

Next, assuming to calculate blur image data of the next row to the point (x, y) represented by the triangle in FIG. 3.

First, sat(x, 3) of the fourth row in Example 3 is calculated. sat(x, 3) can be calculated from input data i(x, 3) and (x, 2) of the third row. Namely, sat(x, 2) is stored in the first cache of the front cache. Then the system of the present invention calculates sat(x, 3) of the fourth row by using input i(x, 3) and sat(x, 2) read from the cache. Further, calculated sat(x, 3) of the fourth row is stored in the back cache of the first cache.

sat$(x, Y_b+1)$ of the row including sat$(X_r, Y_b+1)$ and i$(X_l, Y_b+1)$ can be also calculated in the same way as explained above. Further, it is to be understood that the blur image data of the row next to the point (x, y) can be calculated in the same way as explained above.

Second Embodiment

The second embodiment of the present invention is explained below. Additionally, the second embodiment uses masking technique. In the second embodiment, for example, blur images of a point which is not on focus can be obtained. For example, the point the blur coefficient of which is 0 does not participate in blur image calculation, as described below. This blur coefficient can be contained in memory area such as α channel. In the following explanation, a blur coefficient is represented by w(x, y).

Figure 4:
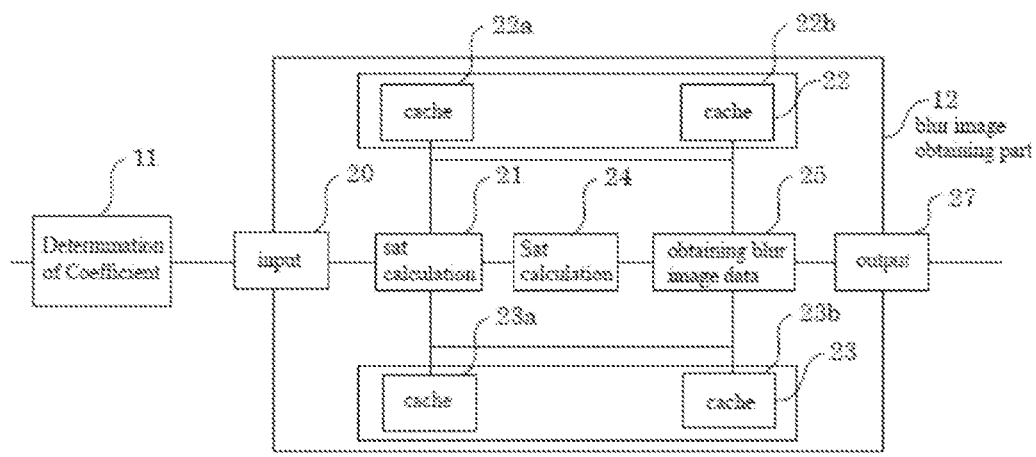
FIG. 4 shows a block diagram of the system of the second embodiment.

FIG. 4 shows a block diagram of the system of the second embodiment. This system comprises a device for determination of coefficient (11) and a blur image obtaining part (12) as shown in FIG. 4. This system can be arranged by applying constructions of the normal image drawing systems as appropriate. The blur image obtaining part (12) comprises an input device for input image data (20), a sat calculation device (21), caches (22, 23), a Sat calculation device (24) and a device for obtaining blur image data (25). The caches are comprised of a first cache (22) and a second cache (23), the first cache are comprised of a front cache (22a) and a back cache (22b), the second cache are comprised of a front cache (23a) and a back cache (23b). Numeral 27 in the FIG. 4 represents an output device. Because FIG. 4 shows the essential modules for the present invention, this system can be arranged by applying modules of the normal computer graphics systems as appropriate. The following each device may be implemented by hardware resources such as circuits, chips, and cores or by cooperative work of hardware and software.

The device for determination of coefficient (11) is a module to determine w(x, y) in following Equation Ia. The blur image obtaining part can be arranged by applying the modules of the first embodiment explained above.

For example, w may be set at I about all (x, y) to blur the whole image. The smaller w may be set at, the smaller the effects from the input original and the image data are.

Equation I can be expressed as Equation Ia by the blur coefficient w.

$$\text{sat}(X,Y)=w(X,Y) \times i(X,Y)+\text{sat}(X-1,Y)-\text{sat}(X,Y-1)-\text{sat}(X-1,Y-1) \quad \text{Equation Ia}$$

In Equation Ia, when X−1 is equal to −1, sat(X−1, Y) and sat(X−1, Y−1) are equal to 0. And when Y−1 is equal to −1, sat(X, Y−1) and sat(X−1, Y−1) are equal to 0.

Equation II is the same in this case.

$$\text{Sat}(x,y)=\text{sat}(Xr, Yt)-\text{sat}(Xr, Yb)-\text{sat}(Xl, Yt)+\text{sat}(Xl, Y_b) \quad \text{Equation II}$$

The blur image data $I_{Blur}(x, y)$ is expressed as Equation III or IIIa in the second embodiment. It may be possible to choose whether Equation III or a by the input data as appropriate.

$$I_{Blur}(x,y)=\text{Sat}(x,y)/w \times h \quad \text{Equation III}$$

$$I_{Blur}(x,y)=\text{Sat}(x,y)/W \quad \text{Equation IIIa}$$

$$W = \sum_{i=-\frac{w}{2}}^{i=\frac{w}{2}} \sum_{j=-\frac{h}{2}}^{j=\frac{h}{2}} w(i, j) \quad [\text{Equation 6}]$$

Namely w×h in Equation III is replaced with the sum of the all values included in the rectangle of width w and height h. Namely, W is the sum of the values of w(x, y) included in the rectangle which has 4 corners: $(X_r, Y_t)$, $(X_r, Y_b)$, $(X_l, Y_t)$ and $(X_l, Y_b)$. If blur coefficients w are equal to 1 on the all points, Equation IIIa is the same as Equation III because W equals w×h.

The values of w(x, y) included in the rectangle as mentioned above may be added to calculate W. For example, if the weight of blur is 5, the sum of w included in the region of x−5 to x+5 and y+5 to y−5 may be calculated.

If a point does not participate in the blur image processing, w becomes 0, so the point does not participate in the sat calculation.

Further, if w equals 0, w(x, y)×i(x, y) also equals 0. Because the value of Equation IIIa equals 0/0 in this case, the value may be set at 0.

Third Embodiment

Next, the third embodiment is explained blow. In this embodiment, the blur effect is changed in accordance with the depth z or distance d. Namely, the value of the depth z(X, Y) or distance d(X, Y) is input to the device for determination of coefficient (11) in FIG. 4. Further, this system stores either or both of threshold A and B. The device for determination of coefficient (11) reads either or both of threshold A and B, and compares with the depth z or distance d. In addition, for example, w(x, y) may be set at the value of w read from a lookup table. If w(x, y) is between 0 and 1, the calculation may be performed to obtain the value.

At a given distance threshold A, all the objects beyond this threshold are out of focus, and thus completely blurred. At a given distance threshold B, all the objects in front are completely focused. For objects between both thresholds, focus to non focus transformation occurs, e.g. non blurred to fully blurred.

As in standard computer graphics, objects are rendered into a frame buffer composed of a color buffer (color image) and a depth buffer (contains depth information relative to a camera). The camera viewing frustum is defined using a front clipping plane and a far clipping plane. In accordance to previous paragraph, two threshold values A and B are defined in this example. These two threshold values correspond to front and far clipping planes.

It is realized by using a 1D lookup table. When the depth value is larger than A, this lookup table sets w at 1. When the depth value is smaller than B, it sets w at 0. When the depth value is between B and A, for example, w may be between 0 and 1. The threshold A and B are stored in a memory. The value of A or B is read from the memory, and then A and B compared with the depth value input from the previous module. When the depth value is larger than A, w is set at 1. When the depth value is smaller than B, w is set at 0. When the depth value is between B and A, for example, w may be transformed successively or interpolated between 0 and 1. For example a weighted average between threshold A and B may be allocated to values between 0 and 1.

When the depth value is a middle value of the A and B, the blur coefficient is a middle value of 0 and 1. The mask values, which are a set of the blur coefficients, may be calculated in the Preprocessing module.

The processing after obtaining the value of w is the same as the one of the second embodiment.

Fourth Embodiment

The fourth embodiment realizes glowing effect. Namely, an object in a graphic is identified, and a blur image of the object is obtained.

For example, an object identification number of an object in a computer graphics system is input to the device for determination of coefficient (11). This number may be referred as a stencil value. According to the object identification number input from a stencil buffer, it is determined whether the blur effect is performed or not. Namely, the information about the target object for the blur effect input to the device for determination of coefficient (11). Then it is determined whether the object is a target for blur effect or not by the object identification number. For example w is set at 0 when i(x, y) indicates that it does not relate to a target for blur effect. Otherwise, the data of the objects which is not a target for blur effect may be sent to a next module with passing through the blur image obtaining part (12).

On the other hand, the information relates to the target for blur effect may be input to the device for determination of coefficient (11). In this case, it is determined whether the object is a target for blur effect or not by using the object identification number. For example w is set at 1 when i(x, y) relates to a target for blur effect. Only the identified object is blurred in this way.

In this case the area of w(x, y)=1 is a target for the complete blur effect. This area can be also used as a mask. On the other hand, blur image can be obtained from the other area which is not a target for the blur effect by applying system constructions of the first embodiment to the third embodiment as appropriate.

Fifth Embodiment

The fifth embodiment relates to the system for an image processing to obtain a silhouette.

Silhouette of any object can be easily obtained by the drawing method of the glowing object relates to the fourth embodiment. Given an object identification number, a mask is created. Further, the mask itself is blurred in the fifth embodiment. The blurred region is slightly larger than the original mask due to the blur operation. Therefore, for some blurred fragment, the object identification is different from the original identification number used to create the mask.

After the silhouette mask is generated, the mask is blurred, and then color values and the blurred mask are adjusted. This facilitates the image processing such as dimly glowing around a character and a weapon in a game.

An object identification number of an object in a computer graphic is input to the device for determination of coefficient (11). Further, the object input device identifies the image data indicates the target object by using the object identification number when the image data is input. The set of identified (x, y) is the mask. Next, the values such as color, transparency and brightness of the mask are read as appropriate. In addition, the mask image data of the new target object is output to the blur image obtaining part (12). Thereupon the blur image obtaining part (12) obtains the blur image of the mask image data and outputs it to the next module. A synthesis of the images is performed in the next module. It means that image data of the surroundings of the object is obtained, so an image processing, such as addition of the color data of the original image and the blurred mask data, is performed in the area. As a result, this system can obtain the silhouetted image.

EXAMPLE 1

Example 1 relates to an example of the image generating system on the basis of the first embodiment.

Figure 5:
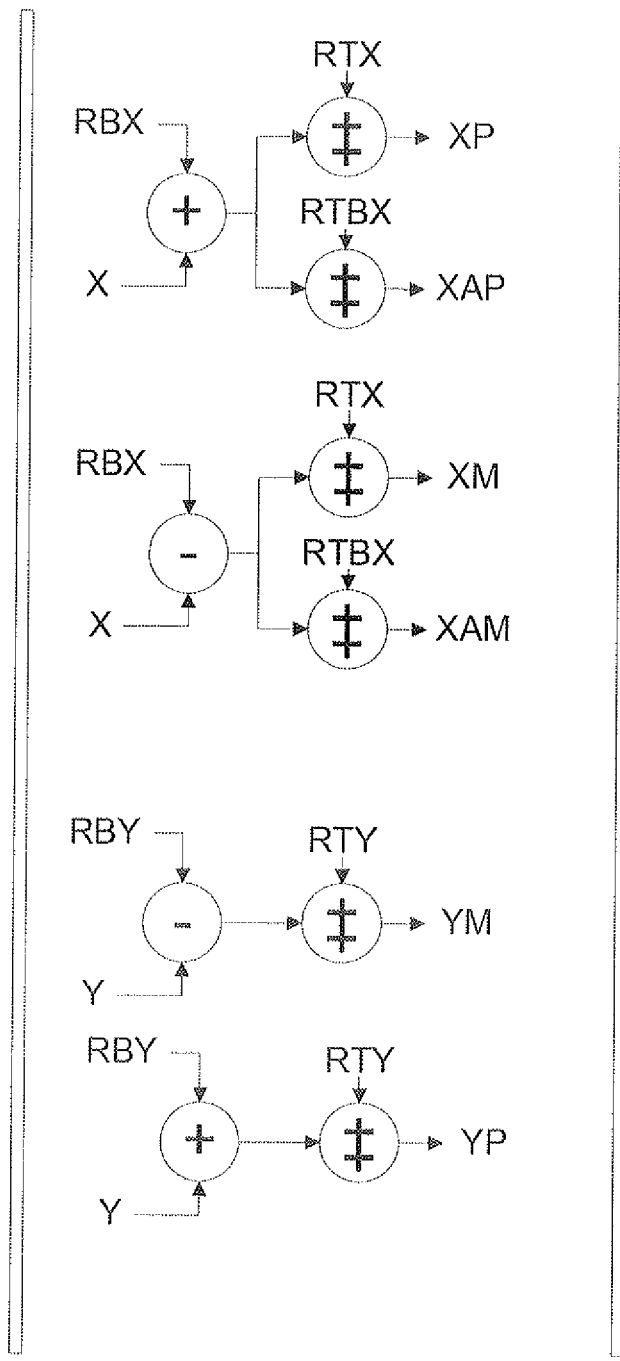
FIG. 5 shows circuit diagrams for implementation of the blur image generating system of the present invention.
Figure 6:
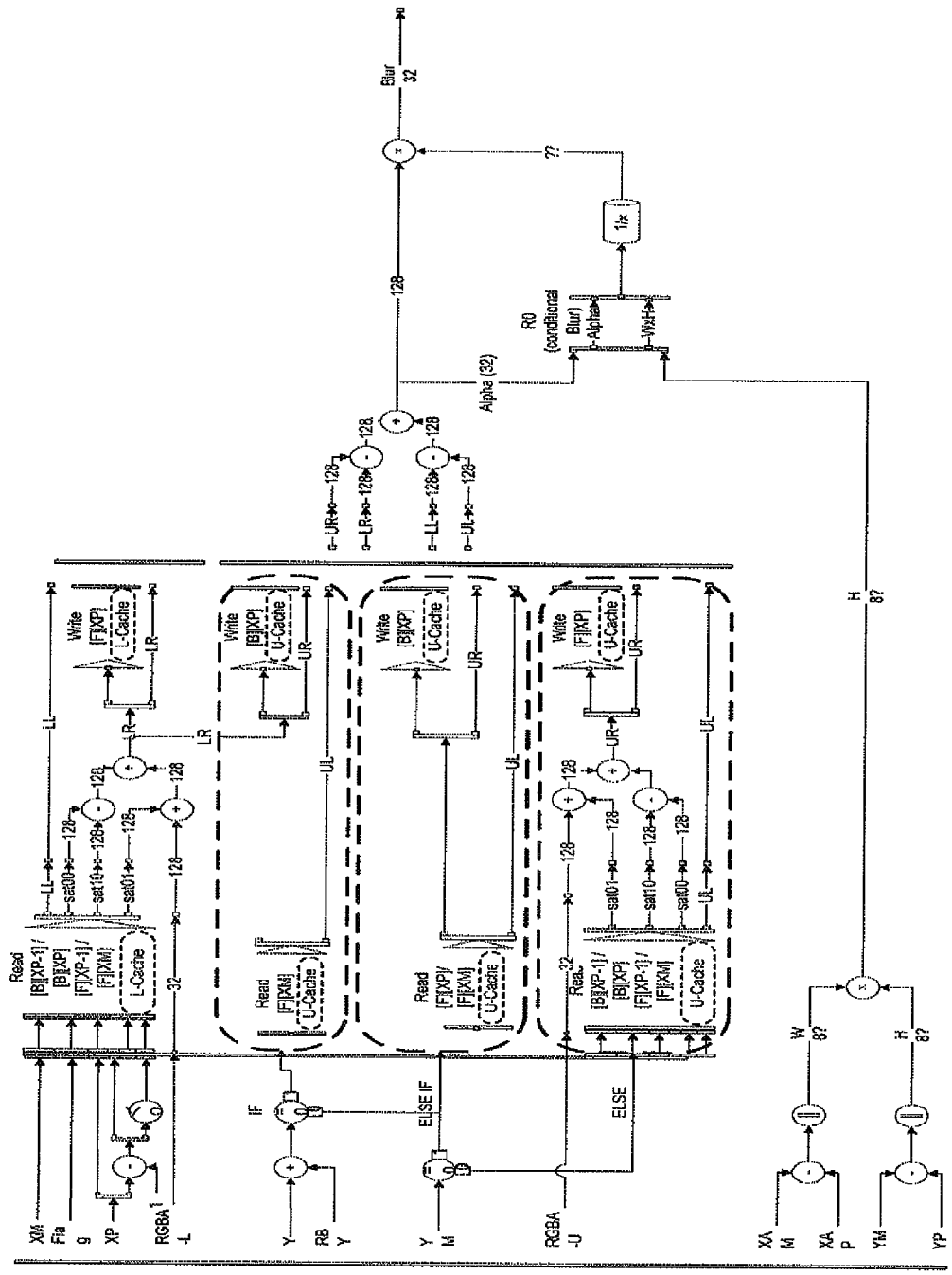
FIG. 6 shows circuit diagrams for implementation of the blur image generating system of the present invention.

FIGS. 5 and 6 show circuit diagrams for implementation of the blur image generating system of the present invention. This circuit can be also implemented by software.

In FIG. 5, RBX represents the blur size of x-direction ((w−1)/2). RBY represents the blur size of y-direction ((h−1)/2). RTX represents the width of input image (W or W−1). RTY represents the height of input image (FT or H−1). RTBX is the sum of RTX and RTY.

The action to obtain blur image by the blur image generating system of the present invention shown in FIGS. 5 and 6 is explained below.

The circuit of FIG. 5 calculates the coordinates of $(X_r, Y_t)$, $(X_r, Y_b)$, $(X_l, Y_t)$ and $(X_l, Y_b)$. The circuit of FIG. 5 also calculates the coordinates of sat$(X_r, Y_t)$, sat$(X_r, Y_b)$, sat$(X_l, Y_t)$ and sat$(X_l, Y_b)$. Thus if the one of $(X_r, Y_t)$, $(X_r, Y_b)$, $(X_l, Y_t)$ and $(X_l, Y_b)$ is virtual coordinates which is not in the original image, the sat of the coordinates is set at 0 or calculated by sat data of other coordinates.

For example, $X_l$ is calculated by summing of x of coordinates (x, y) and the blur width RBX of x-direction (2:((5−1)/2) in case of FIG. 3).

Then the calculated value is clipped in a clipping circuit. Namely, the clipping circuit compares the summed value and RTX, and then, if the summed value is between 0 and RTX, it outputs the summed value as XP just as it is. And if the summed value is larger than RTX, the clipping circuit outputs RTX as XP. And if the summed value is smaller than 0, the clipping circuit outputs 0 as XP.

Another clipping circuit compares the summed value and RTBX, and then, if the summed value is between 0 and RTBX, it outputs the summed value as XAP just as it is. And if the summed value is larger than RTBX, the clipping circuit outputs RTBX as XAP. And if the summed value is smaller than 0, the clipping circuit outputs 0 as XAP.

The circuit shown in FIG. 5 outputs XP, XAP, XM, XAM, YM and YP in the same way.

Next, a blur image is obtained by the circuit shown in FIG. 6. In this figure, "flag" means a flag which designates a cache. LL means the lower left, LR means the lower right, UL means the upper left, UR means the upper right.

For example, assume obtaining the sat on the lower left point (the open circle LL) among the four open circles in FIG. 3. In this case, the x-coordinate of the open circle LL is XP. Then the sat on the open circle LL obtained by using the input data of the open circle (TGBA) and, the sat data on the left coordinates, the upper coordinates and the upper left coordinates of the open circle LL. The coordinates of the points left and upper left of the open circle LL are XP−1. These three sat data are stored in the caches. Thus sat data reading which is necessary for the calculation is possible by the flag designates either the back or the front cache and specifying cache addresses from XP and XP−1.

The calculation of value i and sat may be executed according to Equation 2, and it may be also calculated by the adder and the subtractor shown in FIG. 5. The subtractor may be realized by sign converting circuit and adder.

And Sat(x, y) calculation by using sat$(X_r, Y_t)$, sat$(X_r, Y_b)$, sat$(X_l, Y_t)$ and sat$(X_l, Y_b)$ may be executed according to Equation 3, and it may be also realized by the adder and the subtractor shown in FIG. 5.

Furthermore, the product w×h of w and h is calculated by the multiplier as shown in FIG. 6. And 1/w×h is calculated by inverse circuit(1/x). And then Sat(x, y) and 1/w×h are multiplied to obtain Sat(x, y)/w×h in the multiplier. The value of Sat(x, y)/w×h about R, G, B or α is output as the blur image of the point(x, y).

EXAMPLE 2

Example 2 on the basis of the second embodiment is explained as follows. Additionally, the second embodiment uses masking technique. In the second embodiment, for example, blur images of a point which is not on focus can be obtained. For example, the point the blur coefficient of which is 0 does not participate in blur image calculation, as described below. This blur coefficient can be contained in memory area such as α channel. In the following explanation, a blur coefficient is represented by w(x, y).

Figure 7:
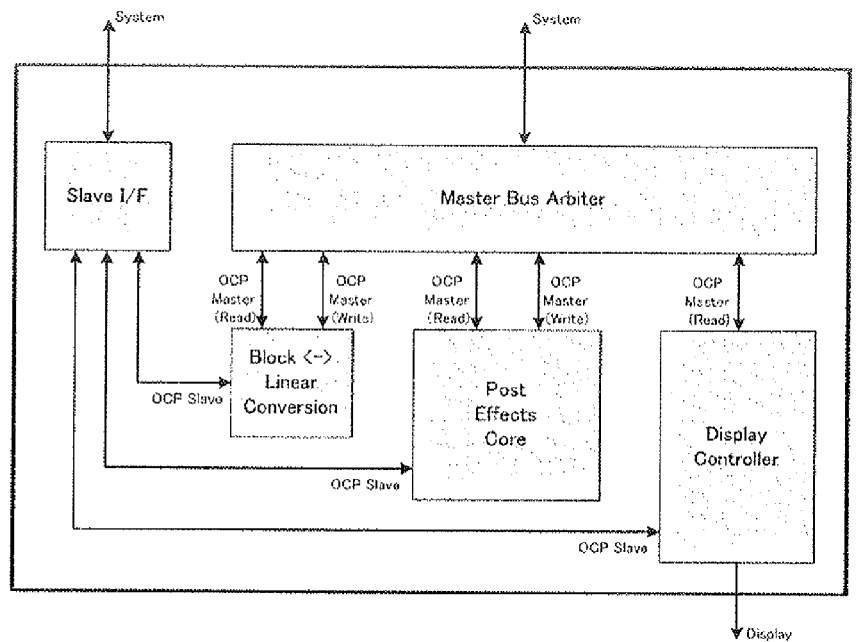
FIG. 7 shows the block diagram which shows the hardware construction to realize the blur image technique of the present invention.

FIG. 7 shows the block diagram which shows the hardware structure to realize the blur image technique of the present invention. The module for blur calculation is installed in PostEffect core.

In FIG. 7, the block Slave I/F is an interface module which allows communication with the other modules of the system, receiving and sending commands or data. The Master Bus Arbiter allows accessing external memory and insuring no read/write conflicts in memory. The examples of the external memory are color buffer and depth buffer. The Block/Linear conversion module functionality is memory data storage format conversion. The Display Controller module functionality is a module handling the output display management on a monitor. The PostEffect core is a module for image processing and includes the Blur module.

Figure 8:
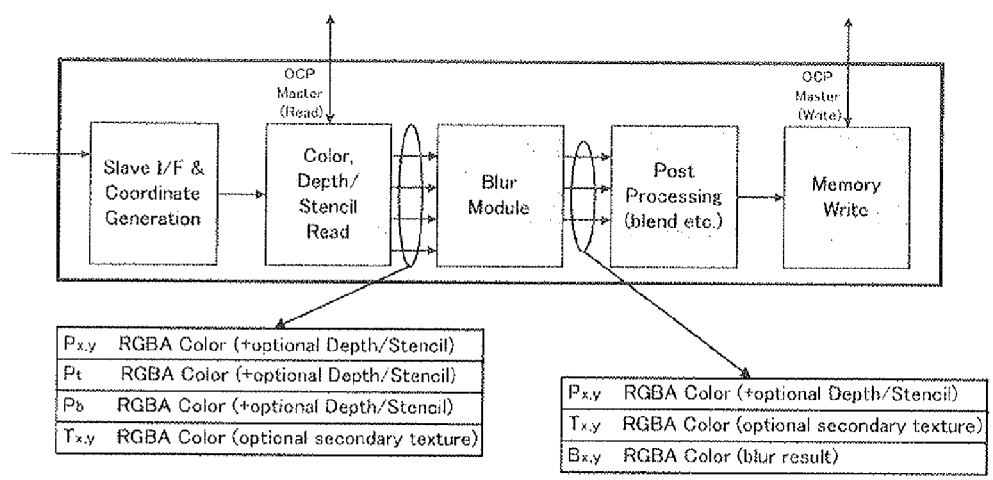
FIG. 8 is a block diagram to explain the PostEffect core module.

FIG. 8 is a block diagram to explain the PostEffect core module. Slave I/F module receives command from other module, e.g. from the Slave I/F module shown in FIG. 7. And the module generates X, Y coordinates based on a scan line Algorithm. For example, each line of the input image is processed sequentially, one after another, and every point coordinate of each line is generated sequentially, one after another.

Figure 9:
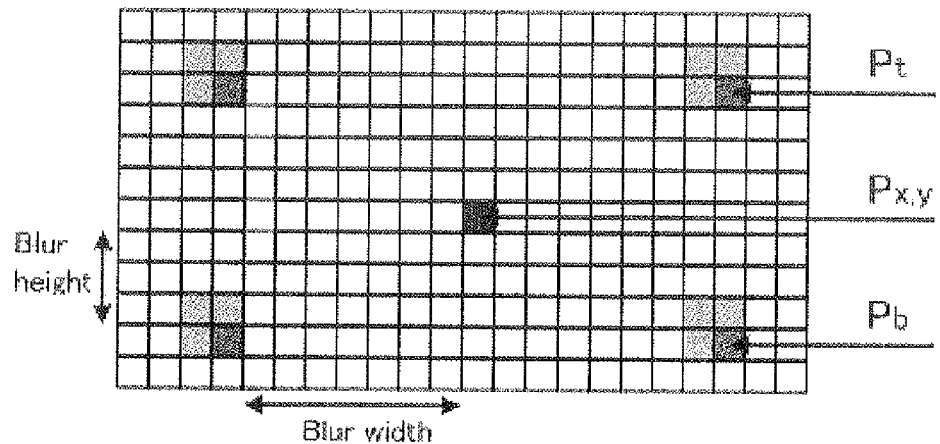
FIG. 9 explains the pixel positions of $P_t$, $P_{xy}$ and $P_b$.

$P_t$, $P_{xy}$ and $P_b$ are generated for each time. t stands for Top, xy stands for current position and b stands for Bottom. FIG. 9 explains the pixel positions of Pt, $P_{xy}$ and $P_b$. $P_t$, $P_{xy}$ and $P_b$ are as FIG. 9 shows. Additionally, an optional coordinate $T_{xy}$ may be needed in case of additional texture access.

Next module is a module reading color values, stencil and depth values. This module performs processing by using the above $P_t$, $P_{xy}$ and $P_b$. This module accesses different memory areas by collaborating with the Master Bus Arbiter. Typically RGB and alpha(A) values, stencil and depth values are read. Result of the memory reads is propagated to the Blur module.

The result of blur processing, which is output from the Blur module, is used as the input to PostProcessing module. In this module, various operations may be performed, such as blending, α, depth or stencil tests, converting colors to luminance. After this processing, the output color data is sent to the Memory Write. The memory stores the obtained color data to Memory by using the Master Bus Arbiter.

Figure 10:
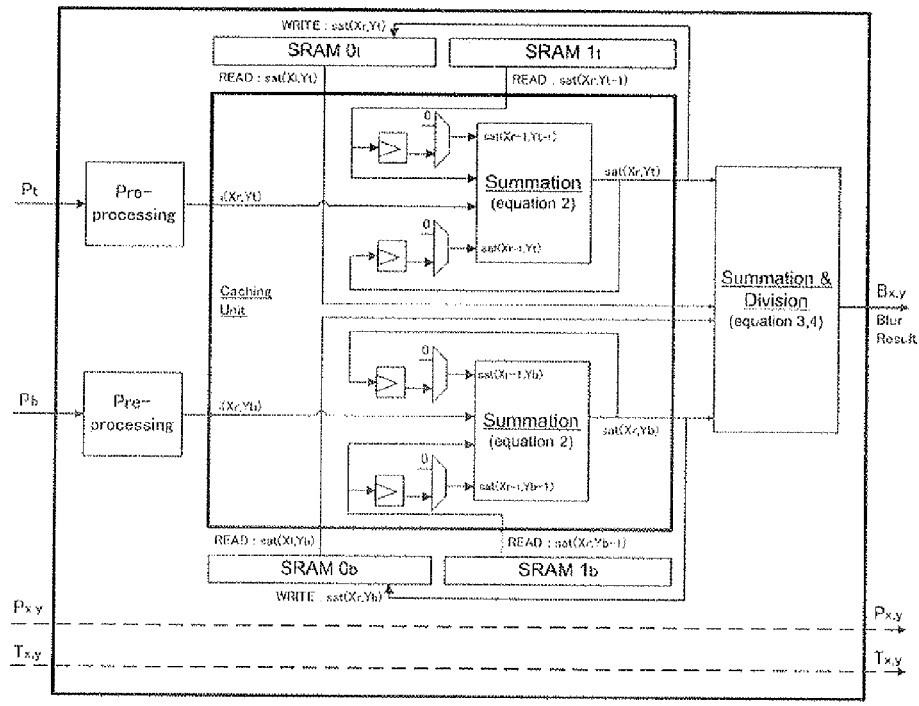
FIG. 10 shows the block diagram corresponding to the hardware implementation used to realize the blur technique.

FIG. 10 shows the block diagram corresponding to the hardware implementation used to realize the blur technique. The $P_{xy}$ and $T_{xy}$ values are not processed in this module and simply propagated to the next PostProcessing module.

Four local memories explained above correspond to SRAM0$t$, SRAM1$t$, SRAM0$b$ and SRAM1$b$ in FIG. 10, which are also represented as SRAM in a lump. SRAM0$t$ and SRAM1$t$ relate to the calculation of the top and SRAM0$b$ and SRAM1$b$ relate to the equation relating to the bottom.

Information used in Equation I is read from these SRAM memories and the input i(x,y) is obtained as an input from the previous module. sat$(X_r, Y_t)$ and sat$(X_r, Y_b)$ are obtained as the two Summation Module output, sat$(X_l, Y_t)$ and sat$(X_l, Y_b)$ can be obtained by reading from the SRAM memories. These values are then used in the Summation and Division module, and eq. II and III, can be evaluated. Result $B_{xy}$ is then output to the next module.

Next, processing on the basis of the second embodiment of the present invention is explained. In this processing, Pt and Pb are pre-processed already before the following processing. As mentioned above, Equation I is as follows.

$$\text{sat}(x,y)=w(x,y)\times i(x,y)+\text{sat}(x-1,y)+\text{sat}(x,y-1)-\text{sat}(x-1,y-1)$$ Equation Ia The value w(x,y) is calculated two times, for both top and bottom input. Calculation of w(x,y) may be the result of depth, α, stencil tests, or color to luminance conversion, or simply uses the additional texture input using appropriate switch selection. The initial input value i(x,y) is typically an RGBA value. After the preprocessing modules, the output is R'G'B'W, where R',G' and B' are modified input RUB color, and W is the weighting value. The resulting terms are then used the Summation modules. Then, in the Summation and Division module, the weighting value is equal to:

$$W = \sum_{i=-\frac{w}{2}}^{i=\frac{w}{2}} \sum_{j=-\frac{h}{2}}^{j=\frac{h}{2}} w(i,j)$$ [Equation 7]

W is the result of the sat calculation and is the output of the Summation modules. And it may be the output result of the SRAM memory reads.

EXAMPLE 3

An embodiment that changes the blur coefficient in accordance with the depth. This example is on the basis of the third embodiments. In this Example 3, the blur effect is changed in accordance with the depth z or distance d from a camera. Depth of field effect can be obtained as follows. For example, in case of far depth of field, the far depth of field is defined as follows. Assuming a scene is defined with a camera, at a given distance threshold A, all the objects beyond this threshold are out of focus, and thus completely blurred. At a given distance threshold B, all the objects in front are completely focused. For objects between both thresholds, focus to non focus transformation occurs, e.g. non blurred to fully blurred.

As in standard computer graphics, objects are rendered into a frame buffer composed of a color buffer (color image) and a depth buffer (contains depth information relative to a camera). The camera viewing frustum is defined using a front clipping plane and a far clipping plane. In accordance to previous paragraph, two threshold values A and B are defined in this example. These two threshold values correspond to front and far clipping planes.

It is realized by using a 1D lookup table. When the depth value is larger than A, this lookup table sets w at 1. When the depth value is smaller than B, it sets w at 0. When the depth value is between B and A, for example, w may be between 0 and 1. The threshold A and B are stored in a memory. The value of A or B read from the memory, and then A and B compared with the depth value input from the previous module. When the depth value is larger than A, w is set at 1. When the depth value is smaller than B, w is set at 0. When the depth value is between B and A, for example, w may be transformed successively between 0 and 1. For example a weighted average between threshold A and B may be allocated to values between 0 and 1.

When the depth value is a middle value of the A and B, the blur coefficient is a middle value of 0 and 1. The mask values, which are a set of the blur coefficients, may be calculated in the PreProcessing module.

Figure 11:
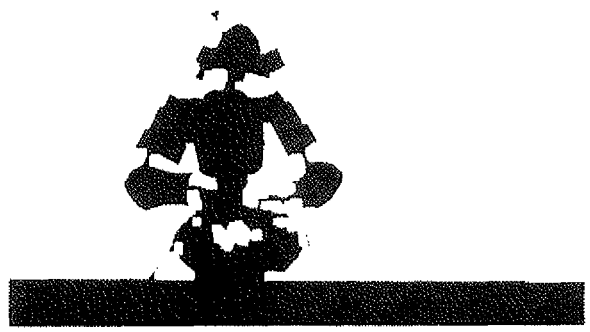
FIG. 11(*a*) shows an image extracted only the objects near the viewpoint from a scene.
Figure 11:
Figure 11:
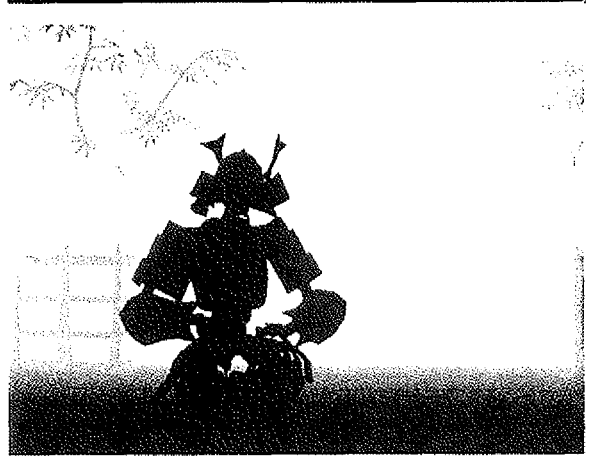

FIG. 11(a) shows an image extracted only the objects near the viewpoint from a scene. The black portion is Boolean mask. This image may read the depth of the pixel data and the thresholds, and then compare them. And only the pixel data the depth value of which is smaller than a predetermined value may be extracted. And the set of only the pixel data the depth of which are smaller than a predetermined value is Boolean mask shown in FIG. 11(a).

Figure 12:
FIG. 12 shows a synthesized image by using the mask of FIG. 11(*c*) without blurring the object of masking.

FIG. 11(b) shows blur image using the mask of FIG. 11(a).
FIG. 11(c) shows a smooth mask using the threshold A and B.
FIG. 12 shows synthesized image using the mask of FIG. 11(e) without blurring the object of masking.

EXAMPLE 4

Glowing

Assuming that drawing objects in computer graphics are rendering into a frame buffer comprising a color buffer storing color image and a stencil buffer storing stencil values relate to the object identification number in the following example.

Figure 13:
FIG. 13 shows an initial image before glowing effect in Example 4.

FIG. 13 shows an initial image before glowing effect in Example 4. In example of FIG. 13, three lantern objects are included as glowing objects. In this example, glowing effect is performed around each one of them.

First step of this method is to define a mask. The w value of the image data which have the stencil value of the lantern object is set at 1. In this example, the blur techniques of the both first and second embodiment are used, resulting in blurring only the lanterns.

Figure 14:
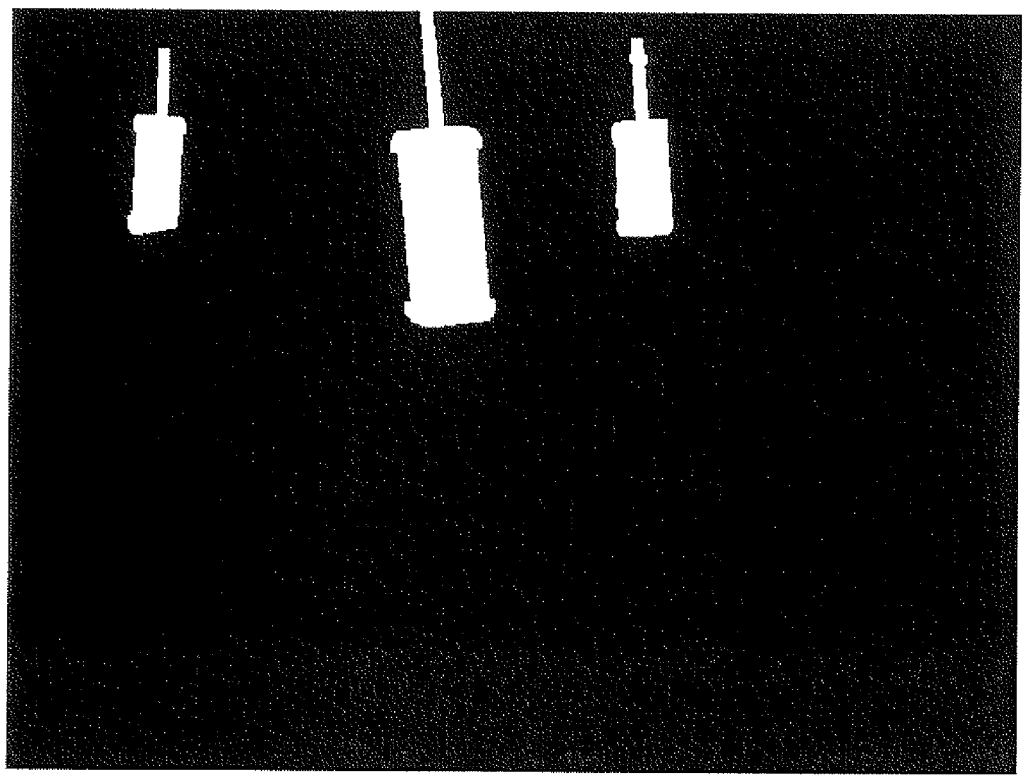
FIG. 14 shows a collection of input image area having stencil value, corresponding to the lantern objects.
Figure 15:
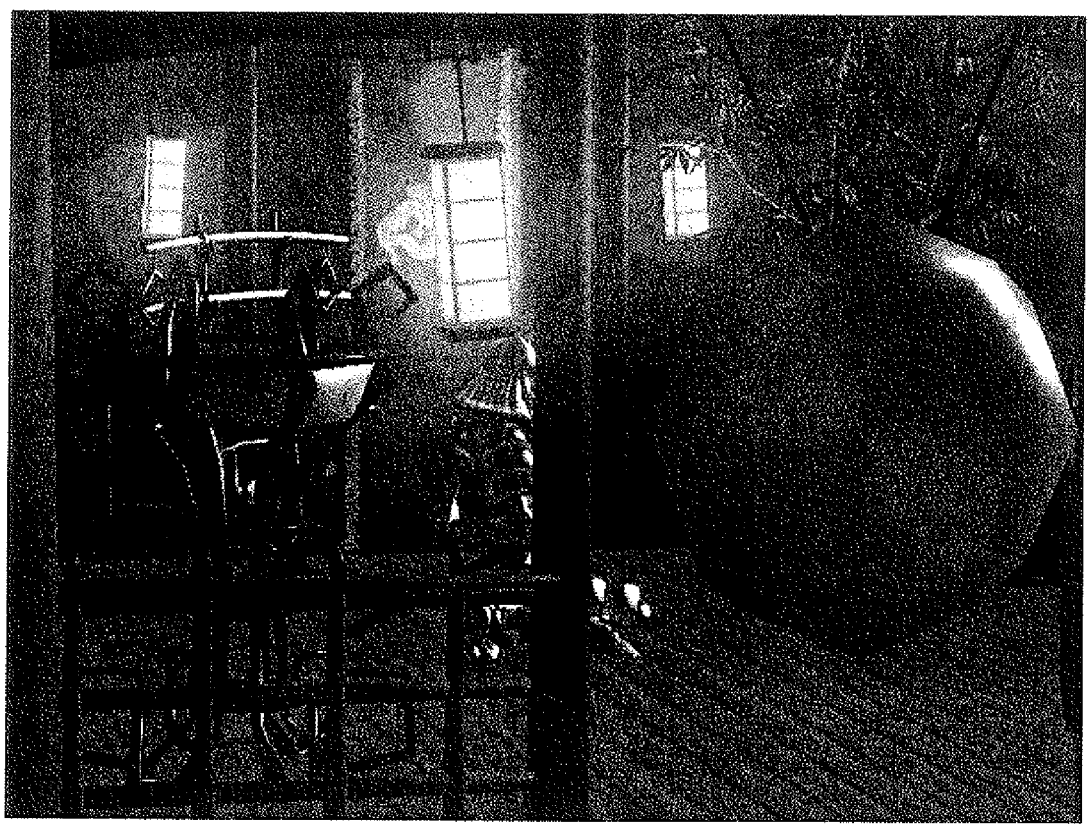
FIG. 15 shows the image obtained in Example 4.

FIG. 14 shows a collection of input image area having stencil value of the lantern objects. FIG. 15 shows synthesized image of the original image and the blurred lantern object images. FIG. 15 shows the image obtained in Example 4.

EXAMPLE 5

Silhouette

Silhouette of any object can be easily obtained while extending the glowing object technique explained above. Given an object identification number, a mask is created.

Figure 16:
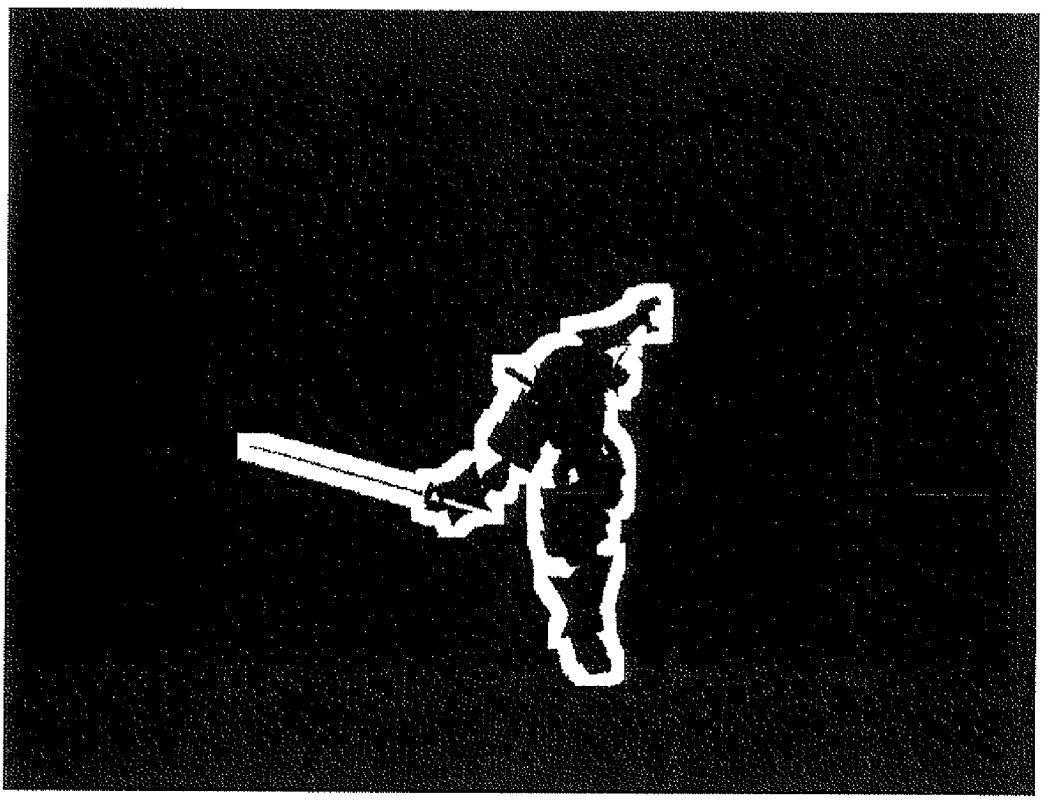
FIG. 16 shows the results of processing of the samurai silhouette.

Image data relating to light are used as mask data of object. And then the mask itself is blurred. The blurred region is slightly larger than the original mask due to the blur operation. Therefore, for some blurred fragment, the object identification is different from the original identification number used to create the mask. In a post processing, for example, such as only fragments with different object identification number are output to memory. FIG. 16 shows the results, where the aim is to obtain the samurai silhouette. As shown in FIG. 16, only the outer part of the samurai, i.e. silhouette, is obtained. The output is actually a Boolean value, corresponding to the result of the object identification number test.

Figure 17:
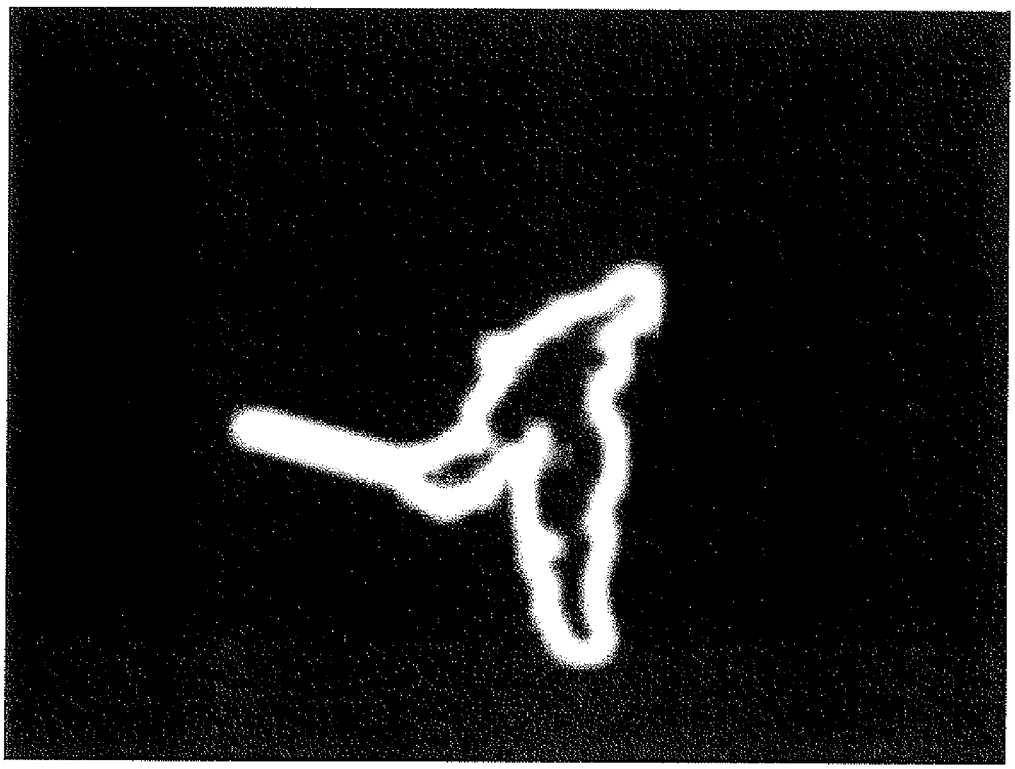
FIG. 17 shows the blurred mask.
Figure 18:
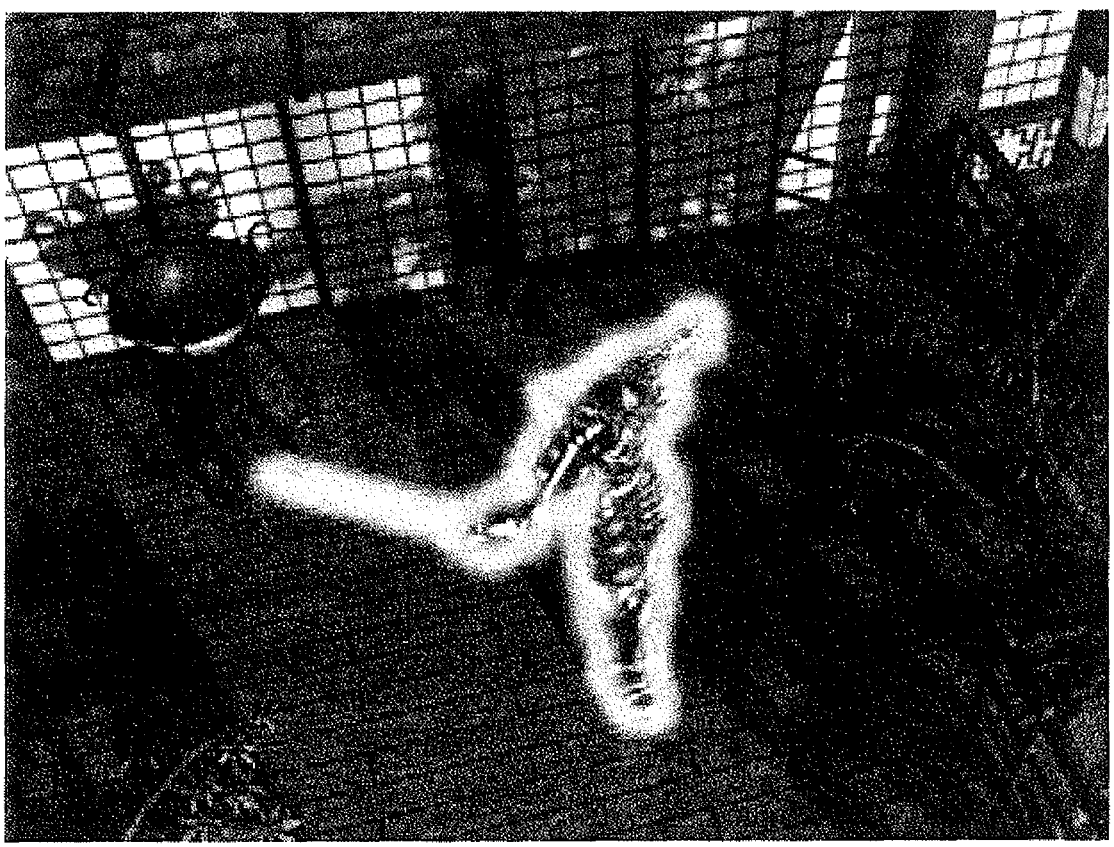
FIG. 18 shows the image obtained in Example 5.

After the silhouette mask is generated, the mask is blurred. FIG. 17 shows the blurred mask. Then the mask and initial image are adjusted. FIG. 18 shows the image obtained in Example 5.

INDUSTRIAL APPLICABILITY

The present invention is a system for obtaining a blur image. Thus it is available in the field of computer graphics.

The invention claimed is:

1. A system for obtaining blur image data for computer graphics, the system comprises a device for determination of coefficient and a blur image obtaining part, coordinates to obtain blur image data are denoted by (x, y), an input image data on the coordinates (x, y) is denoted by i(x, y), an blur image data on the coordinates (x, y) is denoted by $I_{Blur}$(x, y), points the x-coordinate of which differs by a predetermined value from the coordinates (x, y), and the y-coordinate of which differs by a predetermined value from the coordinates (x, y), are denoted by $(X_r, Y_t)$, $(X_r, Y_b)$, $(X_1, Y_t)$ and $(X_1, Y_b)$, l>r and b>t, a value which satisfies following Equation I is denoted by sat(X, Y) on a point (X, Y), a value which satisfies following Equation II is denoted by Sat(x, y), $X_1 - X_r$, is denoted by w, and $Y_b - Y_t$ is denoted by h, when the $I_{Blur}$(x, y) is set at a value denoted by following Equation III, the system further comprising:

an input device for input image data to accept an input image data i(X, Y) on coordinates (X, Y), a sat calculation device to calculate sat data denoted by Equation I, using input image data i(X, Y) which is accepted by the input device, caches to store results of the sat calculation per row calculated by the sat calculation device, a Sat calculation device to read the values of $sat(X_r, Y_t)$, $sat(X_r, Y_b)$, $sat(X_1, Y_t)$ and $sat(X_1, Y_b)$ from the caches, and to calculate the Sat(X, Y) from the values, and, a device for obtaining blur image data calculating $I_{Blur}$(x, y), the Sat(x, y) value calculated by the Sat calculation device, the w and the h, wherein the caches are comprised of a first cache and a second cache, the first cache are comprised of a front cache and a back cache, the second cache are comprised of a front cache and a back cache, wherein the sat calculation device calculates sat(X, 0) which is the sat data of the first row by using input image data i(X, 0) of the first row, the front cache of the first cache stores sat(X, 0) which is the result of the sat calculation of the first row, the sat calculation device calculates sat(X, 1) which is the sat data of the second row by using input image data i(X, 1) of the second row, and sat(X, 0) which is the result of the sat calculation of the first row and stored in the front cache of the first cache, the back cache of the first cache stores sat(X, 1) which is the result of the sat calculation of the second row, the sat calculation device calculates sat(X, 2) which is the sat data of the third row by using input image data i(X, 2) of the third row, and sat(X, 1) which is the result of the sat calculation of the second row and stored in the back cache of the first cache, the front cache of the first cache updates memory by using sat(X, 2) which is the result of the sat calculation of the third row, the calculation is continuing in the same way, sat(X, $Y_t$-1) which is result of the sat calculation of the ($Y_t$-2)th row is stored by either the front cache of the first cache or the back cache of the first cache, sat(X, $Y_t$) which is result of the sat calculation of the ($Y_t$-1)th row is stored by the one of the front cache of the first cache and the back cache of the first cache which does not store the sat(X, $Y_t$-1), the sat calculation device calculates sat(X, $Y_t$+1) which is the sat data of the ($Y_t$)th row by using input image data i(X, $Y_t$+1) of the ($Y_t$)th row and the sat(X, $Y_t$) read from the cache, the front cache of the second cache stores sat(X, $Y_t$+1) which is the result of the sat calculation of the ($Y_t$)th row, the sat calculation device calculates sat(X, $Y_t$+2) which is the result of sat calculation of the ($Y_t$+1)th row by using input image data i(X, $Y_t$+2) of the ($Y_t$+1)th row and the sat(X, $Y_t$+1) read from the front cache of the second cache, the back cache of the second cache stores sat(X, $Y_t$+2) which is the result of the sat calculation of the ($Y_t$+1)th row, the sat calculation device calculates sat(X, $Y_t$+3) which is the result of sat calculation of the ($Y_t$+2)th row by using input image data i(X, $Y_t$+3) of the ($Y_t$+2)th row and the sat(X, $Y_t$+2) read from the back cache of the second cache, the front cache of the second cache updates memory by using sat(X, $Y_t$+3) which is the result of the sat calculation of the ($Y_t$+2)th row, the calculation is continuing in the same way, sat(X, $Y_b$-1) which is the result of the sat calculation of the ($Y_b$-2)th row is stored by either the front cache of the second cache or the back cache of the second cache, sat(X, $Y_b$), which is result of the sat calculation of the ($Y_b$-1)th row, of at least from X=0 to X=$X_1$ is stored by the one of the front cache of the second cache and the back cache of the second cache which does not store the sat(X, $Y_b$-1).

2. The system in accordance with claim 1, wherein i(x, y) is a value of either R, G or B which indicates a color.

3. The system in accordance with claim 1, wherein the i(x, y) is a value of either R, G or B which indicates a color, or an α value which indicates a transparency.

4. The system in accordance with claim 1, wherein the one of the front cache of the first cache and the back cache of the first cache which stores the sat(X, $Y_t$-1) is used as a cache for a process except obtaining blur image data during the calculation of the $I_{Blur}$(x, y) from the result of the sat calculation of the ($Y_t$)th row.

5. A system for obtaining blur image data for computer graphics comprises a device for determination of coefficient and a blur image obtaining part, coordinates to obtain blur image data are denoted by (x, y), an input image data on the coordinates (x, y) is denoted by i(x, y), an blur image data on the coordinates (x, y) is denoted by $I_{Blur}$(x, y), points the x-coordinate of which differs by a predetermined value from the coordinates (x, y), and the y-coordinate of which differs by a predetermined value from the coordinates (x, y), are denoted by $(X_r, Y_t)$, $(X_r, Y_b)$, $(X_l, Y_t)$ and $(X_l, Y_b)$, l>r and b>t, a value which satisfies following Equation Ia is denoted by sat(X, Y) on a point (X, Y), a value which satisfies following Equation II is denoted by Sat(x, y), $X_l-X_r$ is denoted by w, and $Y_b-Y_t$ is denoted by h, when the $I_{Blur}(x, y)$ is set at a value denoted by following Equation III or Ma, the blur image obtaining part comprising:
- an input device for input image data to accept an input image data i(X, Y) on coordinates (X, Y), and a blur coefficient w(X, Y) from the device for determination of coefficient, a sat calculation device to calculate sat data denoted by Equation Ia, using input image data i(X, Y) which is accepted by the input device, caches to store results of the sat calculation per row calculated by the sat calculation device, a Sat calculation device to read the values of $sat(X_r, Y_t)$, $sat(X_r, Y_b)$, $sat(X_l, Y_t)$ and $sat(X_l, Y_b)$ from the caches, and to calculate the Sat(X, Y) from the values, and, a device for obtaining blur image data calculating $I_{Blur}(x, y)$, the Sat(x, y) value calculated by the Sat calculation device, wherein the caches are comprised of a first cache and a second cache, the first cache are comprised of a front cache and a back cache, the second cache are comprised of a front cache and a back cache, wherein the sat calculation device calculates sat(X, 0) which is the sat data of the first row by using input image data i(X, 0) of the first row, the front cache of the first cache stores sat(X, 0) which is the result of the sat calculation of the first row, the sat calculation device calculates sat(X, 1) which is the sat data of the second row by using input image data i(X, 1) of the second row, and sat(X, 0) which is the result of the sat calculation of the first row and stored in the front cache of the first cache, the back cache of the first cache stores sat(X, 1) which is the result of the sat calculation of the second row, the sat calculation device calculates sat(X, 2) which is the sat data of the third row by using input image data i(X, 2) of the third row, and sat(X, 1) which is the result of the sat calculation of the second row and stored in the back cache of the first cache, the front cache of the first cache updates memory by using sat(X, 2) which is the result of the sat calculation of the third row, the calculation is continuing in the same way, $sat(X, Y_t-1)$ which is result of the sat calculation of the $(Y_t-2)$th row is stored by either the front cache of the first cache or the back cache of the first cache, $sat(X, Y_t)$ which is result of the sat calculation of the $(Y_t-1)$th row is stored by the one of the front cache of the first cache and the back cache of the first cache which does not store the $sat(X, Y_t-1)$, the sat calculation device calculates $sat(X, Y_t+1)$ which is the sat data of the $(Y_t)$th row by using input image data $i(X, Y_t+1)$ of the $(Y_t)$th row and the $sat(X, Y_t)$ read from the cache, the front cache of the second cache stores $sat(X, Y_t+1)$ which is the result of the sat calculation of the $(Y_t)$th row, the sat calculation device calculates $sat(X, Y_t+2)$ which is the result of sat calculation of the $(Y_t+1)$th row by using input image data $i(X, Y_t+2)$ of the $(Y_t+1)$th row and the $sat(X, Y_t+1)$ read from the front cache of the second cache, the back cache of the second cache stores $sat(X, Y_t+2)$ which is the result of the sat calculation of the $(Y_t+1)$th row, the sat calculation device calculates $sat(X, Y_t+3)$ which is the result of sat calculation of the $(Y_t+2)$th row by using input image data $i(X, Y_t+3)$ of the $(Y_t+2)$th row and the $sat(X, Y_t+2)$ read from the back cache of the second cache, the front cache of the second cache updates memory by using $sat(X, Y_t+3)$ which is the result of the sat calculation of the $(Y_t+2)$th row, the calculation is continuing in the same way, $sat(X, Y_b-1)$ which is the result of the sat calculation of the $(Y_b-2)$th row is stored by either the front cache of the second cache or the back cache of the second cache, $sat(X, Y_b)$, which is result of the sat calculation of the $(Y_b-1)$th row, of at least from X=0 to $X=X_1$ is stored by the one of the front cache of the second cache and the back cache of the second cache which does not store the $sat(X, Y_b-1)$.

6. The system in accordance with claim 5,
wherein the device for determination of coefficient comprises,
an input device to input information of depth z(X, Y) or distance d(X, Y) of input image data i(X, Y),
an threshold input device to input a first threshold A and a second threshold B,
a comparison calculation device to compare depth z(X, Y) or distance d(X, Y) with the first threshold A and the second threshold B, and
a device for determination of coefficient to determine w(X, Y) corresponding to the result of the comparison calculation device,
wherein the device for determination of coefficient sets w(X, Y) at 0 when the depth z(X, Y) or distance d(X, Y) is larger than or equal to the first threshold A, set w(X, Y) at 1 when the depth z(X, Y) or distance d(X, Y) is smaller than or equal to the second threshold B, and set w(X, Y) at a value between 0 and 1 when the depth z(X, Y) or distance d(X, Y) is larger than the second threshold B and smaller than the first threshold A.

7. The system in accordance with claim 5,
wherein the device for determination of coefficient comprises,
an object input device to input information of an target object for blur effect, the input image data i(X, Y) and an object identification number in a computer graphic, and,
a device for determination of coefficient to set the blur coefficient w(X, Y), which relates to the target object for blur effect, at 1 by grasping the target object for blur effect by using the information of the target object for blur effect, the object identification number and input image data i(X, Y).

8. The system in accordance with claim 5,
wherein the device for determination of coefficient comprises,
an object input device to input information of an target object for blur effect and the input image data i(X, Y) and an object identification number in a computer graphic,
a mask area obtaining device for obtaining a mask area of pixel data of the object identified by the object input device,
an image data obtaining device of a mask area for obtaining new image data of the mask area obtained by the mask area obtaining device, and,
a device for determination of coefficient to set the coefficient w(x, y) of the mask area at 1,
wherein the blur image obtaining part accepts the coefficient w(x, y)=1 and the new image data as input image data, concerning the mask area determined by the device for determination of coefficient, and then obtains the blur image of the mask of the object.

9. A non-transitory computer-readable recording medium in which a computer program is stored, wherein the program makes a computer to work as a system, coordinates to obtain blur image data are denoted by (x, y), an input image data on the coordinates (X, Y) is denoted by i(X, Y), an blur image data on the coordinates (x, y) is denoted by $I_{Blur}(x, y)$, points the x-coordinate of which differs by a predetermined value from the coordinates (x, y), and the y-coordinate of which differs by a predetermined value from the coordinates (x, y), are denoted by $(X_r, Y_t)$, $(X_r, Y_b)$, $(X_l, Y_t)$ and $(X_l, Y_b)$, l>r and b>t, a value which satisfies following Equation I is denoted by sat(X, Y) on a point (X, Y), a value which satisfies following Equation II is denoted by Sat(x, y), $X_l - X_r$ is denoted by w, and $Y_b - Y_t$ is denoted by h, when the $I_{Blur}(x, y)$ is set at a value denoted by following Equation III, the system comprising:

an input device for input image data to accept the input image data i(X, Y), a sat calculation device to calculate sat data denoted by Equation I, using input image data i(X, Y) which is accepted by the input device, caches to store results of the sat calculation per row calculated by the sat calculation device, a Sat calculation device to read the values of $sat(X_r, Y_t)$, $sat(X_r, Y_b)$, $sat(X_l, Y_t)$ and $sat(X_l, Y_b)$ from the caches, and to calculate the Sat(X, Y) from the values, and, a device for obtaining blur image data using $I_{Blur}(x, y)$, the Sat(x, y) value calculated by the Sat calculation device, the w and the h, wherein the caches are comprised of a first cache and a second cache, the first cache are comprised of a front cache and a back cache, the second cache are comprised of a front cache and a back cache, wherein the sat calculation device calculates sat(X, 0) which is the sat data of the first row by using input image data i(X, 0) of the first row, the front cache of the first cache stores sat(X, 0) which is the result of the sat calculation of the first row, the sat calculation device calculates sat(X, 1) which is the sat data of the second row by using input image data i(X, 1) of the second row, and sat(X, 0) which is the result of the sat calculation of the first row and stored in the front cache of the first cache, the back cache of the first cache stores sat(X, 1) which is the result of the sat calculation of the second row, the sat calculation device calculates sat(X, 2) which is the sat data of the third row by using input image data i(X, 2) of the third row, and sat(X, 1) which is the result of the sat calculation of the second row and stored in the back cache of the first cache, the front cache of the first cache updates memory by using sat(X, 2) which is the result of the sat calculation of the third row, the calculation is continuing in the same way, $sat(X, Y_t-1)$ which is result of the sat calculation of the $(Y_t-2)$th row is stored by either the front cache of the first cache or the back cache of the first cache, $sat(X, Y_t)$ which is result of the sat calculation of the $(Y_t-1)$th row is stored by the one of the front cache of the first cache and the back cache of the first cache which does not store the $sat(X, Y_t-1)$, the sat calculation device calculates $sat(X, Y_t+1)$ which is the sat data of the $(Y_t)$th row by using input image data $i(X, Y_t+1)$ of the $(Y_t)$th row and the $sat(X, Y_t)$ read from the cache, the front cache of the second cache stores $sat(X, Y_t+1)$ which is the result of the sat calculation of the $(Y_t)$th row, the sat calculation device calculates $sat(X, Y_t+2)$ which is the result of sat calculation of the $(Y_t+1)$th row by using input image data $i(X, Y_t+2)$ of the $(Y_t+1)$th row and the $sat(X, Y_t+1)$ read from the front cache of the second cache, the back cache of the second cache stores $sat(X, Y_t+2)$ which is the result of the sat calculation of the $(Y_t+1)$th row, the sat calculation device calculates $sat(X, Y_t+3)$ which is the result of sat calculation of the $(Y_t+2)$th row by using input image data $i(X, Y_t+3)$ of the $(Y_t+2)$th row and the $sat(X, Y_t+2)$ read from the back cache of the second cache, the front cache of the second cache updates memory by using $sat(X, Y_t+3)$ which is the result of the sat calculation of the $(Y_t+2)$th row, the calculation is continuing in the same way, $sat(X, Y_b-1)$ which is the result of the sat calculation of the $(Y_b-2)$th row is stored by either the front cache of the second cache or the back cache of the second cache, $sat(X, Y_b)$, which is result of the sat calculation of the $(Y_b-1)$th row, of at least from X=0 to $X=X_1$ is stored by the one of the front cache of the second cache and the back cache of the second cache which does not store the $sat(X, Y_b-1)$.

* * * * *